US008200910B2

(12) United States Patent
Arimilli et al.

(10) Patent No.: US 8,200,910 B2
(45) Date of Patent: Jun. 12, 2012

(54) GENERATING AND ISSUING GLOBAL SHARED MEMORY OPERATIONS VIA A SEND FIFO

(75) Inventors: Lakshminarayana B. Arimilli, Austin, TX (US); Robert S. Blackmore, Poughkeepsie, NY (US); Chulho Kim, Poughkeepsie, NY (US); Ramakrishnan Rajamony, Austin, TX (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 12/024,664

(22) Filed: Feb. 1, 2008

(65) Prior Publication Data
US 2009/0199195 A1 Aug. 6, 2009

(51) Int. Cl.
G06F 12/00 (2006.01)
(52) U.S. Cl. .................... 711/147; 711/125; 718/104
(58) Field of Classification Search .................. 711/147, 711/125; 718/104
See application file for complete search history.

(56) References Cited

U.S. PATENT DOCUMENTS

| 4,204,113 A | 5/1980 | Giraud et al. |
| 4,704,606 A | 11/1987 | Hasley |
| 4,999,834 A | 3/1991 | Leo et al. |
| 5,016,169 A | 5/1991 | Koya et al. |
| 5,261,067 A | 11/1993 | Whelan |
| 5,408,650 A | 4/1995 | Arsenault |
| 5,604,882 A | 2/1997 | Hoover |
| 5,617,537 A | 4/1997 | Yamada |
| 5,640,504 A | 6/1997 | Johnson, Jr. |
| 5,682,512 A | 10/1997 | Tetrick |
| 5,706,434 A | 1/1998 | Kremen et al. |
| 5,729,714 A | 3/1998 | Dei |
| 5,765,146 A | 6/1998 | Wolf et al. |
| 5,887,138 A | 3/1999 | Hagersten et al. |
| 5,900,020 A | 5/1999 | Safranek et al. |

(Continued)

FOREIGN PATENT DOCUMENTS
WO    WO 9832077    7/1998
(Continued)

OTHER PUBLICATIONS

U.S. Appl. No. 12/024,367, "Mechanisms to Order Global Shared Memory Operations", Non-Final Office Action dated Dec. 21, 2010.

(Continued)

Primary Examiner — Yong Choe
(74) Attorney, Agent, or Firm — Yudell Isidore Ng Russell PLLC

(57) ABSTRACT

A method for issuing global shared memory (GSM) operations from an originating task on a first node coupled to a network fabric of a distributed network via a host fabric interface (HFI). The originating task generates a GSM command within an effective address (EA) space. The task then places the GSM command within a send FIFO. The send FIFO is a portion of real memory having real addresses (RA) that are memory mapped to EAs of a globally executing job. The originating task maintains a local EA-to-RA mapping of only a portion of the real address space of the globally executing job. The task enables the HFI to retrieve the GSM command from the send FIFO into an HFI window allocated to the originating task. The HFI window generates a corresponding GSM packet containing GSM operations and/or data, and the HFI window issues the GSM packet to the network fabric.

15 Claims, 14 Drawing Sheets

U.S. PATENT DOCUMENTS

| | | | |
|---|---|---|---|
| 5,918,229 | A | 6/1999 | Davis et al. |
| 5,940,870 | A | 8/1999 | Chi et al. |
| 6,003,123 | A | 12/1999 | Carter et al. |
| 6,128,672 | A | 10/2000 | Lindsley |
| 6,181,704 | B1 | 1/2001 | Drottar et al. |
| 6,205,498 | B1 | 3/2001 | Habusha et al. |
| 6,256,715 | B1 | 7/2001 | Hansen |
| 6,275,900 | B1 | 8/2001 | Liberty |
| 6,446,185 | B2 | 9/2002 | Hagersten |
| 6,574,721 | B1 | 6/2003 | Christenson et al. |
| 6,594,736 | B1 | 7/2003 | Parks |
| 6,598,130 | B2 | 7/2003 | Harris et al. |
| 6,628,615 | B1 | 9/2003 | Joseph et al. |
| 6,665,758 | B1 | 12/2003 | Frazier et al. |
| 6,668,299 | B1 | 12/2003 | Kagan et al. |
| 6,721,948 | B1 | 4/2004 | Morgan |
| 6,738,889 | B2 | 5/2004 | Godtland et al. |
| 6,760,783 | B1 | 7/2004 | Berry |
| 6,775,719 | B1 | 8/2004 | Leitner |
| 6,799,200 | B1 | 9/2004 | Blackmore et al. |
| 6,826,653 | B2 | 11/2004 | Duncan |
| 6,826,660 | B2 | 11/2004 | Hagersten et al. |
| 6,829,666 | B1 | 12/2004 | Deneroff |
| 6,859,867 | B1 | 2/2005 | Berry |
| 6,928,529 | B2 | 8/2005 | Shinomiya |
| 6,948,004 | B2 | 9/2005 | Gasbarro |
| 6,952,722 | B1 | 10/2005 | Podila et al. |
| 6,981,125 | B2 | 12/2005 | Emmes |
| 7,149,873 | B2 | 12/2006 | Mohideen et al. |
| 7,181,541 | B1 | 2/2007 | Burton |
| 7,213,081 | B2 | 5/2007 | Narasimham et al. |
| 7,307,710 | B2 | 12/2007 | Gatsios |
| 7,356,666 | B2 | 4/2008 | Kanai et al. |
| 7,360,028 | B1 | 4/2008 | Tremblay |
| 7,447,867 | B2 | 11/2008 | Soja et al. |
| 7,464,115 | B2 | 12/2008 | Carter et al. |
| 7,509,646 | B1 | 3/2009 | Maw et al. |
| 7,533,238 | B2 | 5/2009 | Burns et al. |
| 7,631,128 | B1 | 12/2009 | Sgrosso et al. |
| 7,797,588 | B2 | 9/2010 | Arimilli et al. |
| 7,814,166 | B2 | 10/2010 | Suzuoki |
| 7,844,746 | B2 | 11/2010 | Arimilli et al. |
| 7,873,879 | B2 | 1/2011 | Arimilli et al. |
| 7,877,436 | B2 | 1/2011 | Arimilli et al. |
| 7,921,261 | B2 | 4/2011 | Blackmore et al. |
| 7,925,842 | B2 | 4/2011 | Arimilli et al. |
| 7,966,454 | B2 | 6/2011 | Arimilli et al. |
| 2001/0013089 | A1 | 8/2001 | Weber |
| 2001/0027512 | A1 | 10/2001 | Hagersten |
| 2002/0023069 | A1 | 2/2002 | Blank et al. |
| 2002/0032844 | A1 | 3/2002 | West |
| 2002/0042868 | A1 | 4/2002 | Godtland et al. |
| 2002/0071450 | A1 | 6/2002 | Gasbarro |
| 2002/0078271 | A1 | 6/2002 | Berry |
| 2002/0087813 | A1 | 7/2002 | Harris et al. |
| 2002/0184476 | A1 | 12/2002 | McKenney |
| 2003/0002590 | A1 | 1/2003 | Kaku |
| 2003/0009640 | A1 | 1/2003 | Arimilli et al. |
| 2003/0014516 | A1 | 1/2003 | Blackmore et al. |
| 2003/0069938 | A1 | 4/2003 | Russell |
| 2003/0069939 | A1 | 4/2003 | Russell |
| 2003/0163642 | A1 | 8/2003 | Borkenhagen et al. |
| 2003/0236848 | A1 | 12/2003 | Neiman et al. |
| 2004/0059790 | A1 | 3/2004 | Austin-Lane |
| 2004/0064601 | A1 | 4/2004 | Swanberg |
| 2004/0098447 | A1 | 5/2004 | Verbeke et al. |
| 2004/0107265 | A1 | 6/2004 | Yasunaga |
| 2004/0107419 | A1 | 6/2004 | Blackmore et al. |
| 2004/0146070 | A1 | 7/2004 | Blackmore et al. |
| 2004/0181522 | A1 | 9/2004 | Jardin |
| 2004/0181523 | A1 | 9/2004 | Jardin |
| 2004/0181524 | A1 | 9/2004 | Jardin |
| 2004/0186832 | A1 | 9/2004 | Jardin |
| 2004/0260906 | A1 | 12/2004 | Landin et al. |
| 2005/0071772 | A1 | 3/2005 | Jaeger |
| 2005/0091439 | A1 | 4/2005 | Mohideen et al. |
| 2005/0108715 | A1* | 5/2005 | Kanai et al. ............ 718/100 |
| 2005/0147114 | A1 | 7/2005 | Stewart et al. |
| 2005/0149903 | A1 | 7/2005 | Archambault |
| 2005/0188373 | A1 | 8/2005 | Inoue |
| 2005/0238035 | A1 | 10/2005 | Riley |
| 2006/0045109 | A1 | 3/2006 | Blackmore et al. |
| 2006/0069878 | A1 | 3/2006 | Aguilar et al. |
| 2006/0075197 | A1 | 4/2006 | Shimada |
| 2006/0126770 | A1 | 6/2006 | Yamazaki |
| 2006/0143389 | A1 | 6/2006 | Kilian et al. |
| 2006/0179255 | A1 | 8/2006 | Yamazaki |
| 2007/0033592 | A1 | 2/2007 | Roediger et al. |
| 2007/0050763 | A1 | 3/2007 | Kagan et al. |
| 2007/0073826 | A1 | 3/2007 | Isani |
| 2007/0073976 | A1 | 3/2007 | Chitlur et al. |
| 2007/0076649 | A1 | 4/2007 | Lin |
| 2007/0124355 | A1* | 5/2007 | Johns et al. ............ 708/270 |
| 2007/0180161 | A1 | 8/2007 | Asada |
| 2007/0243867 | A1 | 10/2007 | Graves et al. |
| 2008/0069125 | A1 | 3/2008 | Reed et al. |
| 2008/0091886 | A1 | 4/2008 | Terakawa et al. |
| 2009/0153897 | A1 | 6/2009 | Blackmore et al. |
| 2009/0157996 | A1 | 6/2009 | Arimilli et al. |
| 2009/0158298 | A1 | 6/2009 | Saxena et al. |
| 2009/0198837 | A1 | 8/2009 | Arimilli et al. |
| 2009/0198971 | A1 | 8/2009 | Arimilli et al. |
| 2009/0199182 | A1 | 8/2009 | Arimilli et al. |
| 2009/0199191 | A1 | 8/2009 | Arimilli et al. |
| 2009/0199194 | A1 | 8/2009 | Arimilli et al. |
| 2010/0070675 | A1 | 3/2010 | Yamazaki |

FOREIGN PATENT DOCUMENTS

| | | |
|---|---|---|
| WO | WO 2005015428 | 2/2005 |
| WO | WO 2007105373 | 9/2007 |

OTHER PUBLICATIONS

U.S. Appl. No. 12/024,367, "Mechanisms to Order Global Shared Memory Operations", Final Office Action dated Jun. 8, 2011.

U.S. Appl. No. 12/024,397, "Host Fabric Interface (HFI) to Perform Global Shared Memory (GSM) Operations," Non-Final Office Action dated Mar. 30, 2011.

U.S. Patent No. 7921261, "Reserving a Global Address Space," Non-Final Office Action dated Jul. 22, 2010.

US Patent No. 7921261, "Reserving a Global Address Space," Notice of Allowance dated Nov. 18, 2010.

US Patent No. 7797588, "Mechanism to Provide Software Guaranteed Reliability for GSM Operations," Notice of Allowance dated May 14, 2010.

US Patent No. 7873879, "Mechanism to Perform Debugging of Global Shared Memory (GSM) Operations," Notice of Allowance dated Sep. 10, 2010.

Reasoning About Code Mobility with Mobile UNITY, Picco, GP.et al.; 2001.

Automatic Network Generation for System-on-Chip Communication Design, Shin, D.et al. ; 2005.

U.S. Appl. No. 12/024,678, "Mechanism for Guaranteeing Delivery of Multi-Packet GSM Message," Non-Final Office Action dated Apr. 26, 2011.

US Patent No. 7844746, "Accessing an Effective Address and Determining Whether the Effective Address is Associated with Remotely Coupled I/O Adapters," Non-Final Office Action dated Mar. 10, 2010.

U.S. Patent No. 7844746, "Accessing an Effective Address and Determining Whether the Effective Address is Associated with Remotely Coupled I/O Adapters," Notice of Allowance dated Jul. 21, 2010.

US Patent No. 7925842, "Allocating a Global Shared Memory," Non-Final Office Action dated Aug. 30, 2010.

US Patent No. 7925842, "Allocating a Global Shared Memory," Notice of Allowance dated Dec. 9, 2010.

US Patent No. 7966454, "Issuing Global Shared Memory Operations Via Direct Cache Injection to a Host Fabric Interface," Non-Final Office Action dated Oct. 25, 2010.

US Patent No. 7966454, "Issuing Global Shared Memory Operations Via Direct Cache Injection to a Host Fabric Interface," Notice of Allowance dated Feb. 14, 2011.

US Patent No. 7877436, "Mechanism to Provide Reliability Through Packet Drop Detection" Non-Final Office Action dated May 5, 2010.

US Patent No. 7877436, "Mechanism to Provide Reliability Through Packet Drop Detection," Notice of Allowance dated Sep. 17, 2010.0.

US Patent No. 7873879, "Mechanism to Perform Debugging of Global Shared Memory (GSM) Operations," Non-Final Office Action dated May 11, 2010.

Raicu et al., Falcon: a Fast and Light-weight task execution framework; Nov. 10-16, 2007; ACM, pp. 1-12.

U.S. Appl. No. 12/024,427, "Notification to Task of Completion of GSM Operations by Initiator Node, " NonFinal Office Action dated Oct. 6, 2011.

U.S. Appl. No. 12/024,397, "Host Fabric Interface (HFI) to Perform Global Shared Memory (GSM) Operations," Non-Final Office Action dated Feb. 2, 2012.

U.S. Appl. No. 12/024,410, "Mechanism to Prevent Illegal Access to Task Address Space by Unauthorized Tasks," Non-Final Office Action dated Nov. 4, 2011.

U.S. Appl. No. 12/024,651,"Notification by Task of Completion of GSM Operations at Target Node," Non Final Office Action dated Sep. 29, 2011.

U.S. Appl. No. 12/024,651,"Notification by Task of Completion of GSM Operations at Target Node," Notice of Allowance dated Mar. 19, 2012.

U.S. Appl. No. 12/024,678, "Guaranteeing Delivery of Multi-Packet GSM Messages," Notice of Allowance dated Dec. 2, 2011.

U.S. Appl. No. 12/024,367, "Mechanisms to Order Global Shared Memory Operations," Notice of Allowance dated Feb. 15, 2012.

* cited by examiner

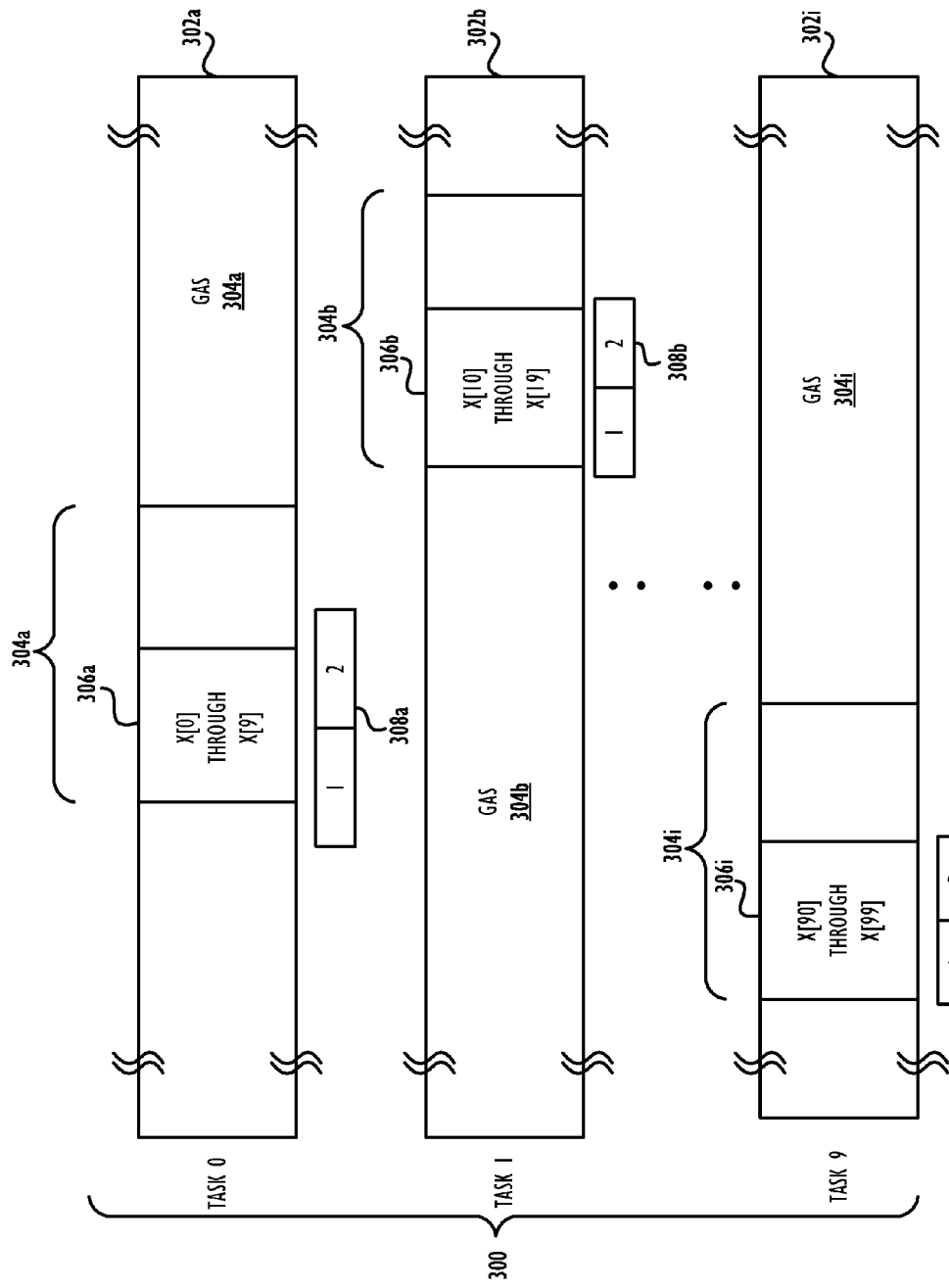

GENERATING AND ISSUING GLOBAL SHARED MEMORY OPERATIONS VIA A SEND FIFO

GOVERNMENT RIGHTS

This invention was made with United States Government support under Agreement No. HR0011-07-9-0002 awarded by DARPA. The Government has certain rights in the invention.

CROSS REFERENCE TO RELATED APPLICATIONS

The present application is related to the following U.S. patent applications, filed on even date herewith and incorporated herein by reference in their entirety:

- U.S. patent application Ser. No. 11/958,668, entitled "Reserving a Global Address Space;
- U.S. patent application Ser. No. 11/958,956, entitled "Allocating a Global Shared Memory;"
- U.S. patent application Ser. No. 12/024,427, entitled "Notification to Task of Completion of GSM Operations By Initiator Node;"
- U.S. patent application Ser. No. 12/024,437, entitled "Issuing Global Shared Memory Operations Via Direct Cache Injection to a Host Fabric Interface;"
- U.S. patent application Ser. No. 12/024,367, entitled "Mechanisms to Order Global Shared Memory Operations;"
- U.S. patent application Ser. No. 12/024,397, entitled "Host Fabric Interface (HFI) to Perform Global Shared Memory (GSM) Operations;"
- U.S. patent application Ser. No. 12/024,410, entitled "Mechanism to Prevent Illegal Access to Task Address Space By Unauthorized Tasks;"
- U.S. patent application Ser. No. 12/024,585, entitled "Mechanism to Perform Debugging of Global Shared Memory (GSM) Operations;"
- U.S. patent application Ser. No. 12/024,600, entitled "Mechanism to Provide Reliability Through Packet Drop Detection;"
- U.S. patent application Ser. No. 12/024,637, entitled "Mechanism to Provide Software Guaranteed Reliability for GSM Operations;"
- U.S. patent application Ser. No. 12/024,651, entitled "Notification By Task of Completion of GSM Operations at Target Node;"
- U.S. patent application Ser. No. 12/024,678, entitled "Mechanism for Guaranteeing Delivery of Multi-Packet GSM Message."

BACKGROUND

1. Technical Field

The present invention generally relates to data processing systems and in particular to distributed data processing systems. Still more particularly, the present invention relates to data processing systems configured to support execution of global shared memory (GSM) operations.

2. Description of the Related Art

It is well-known in the computer arts that greater computer system performance can be achieved by harnessing the processing power of multiple individual processing units. Multi-processor (MP) computer systems can be designed with a number of different topologies, of which various ones may be better suited for particular applications depending upon the performance requirements and software environment of each application. One common MP computer architecture is a symmetric multi-processor (SMP) architecture in which multiple processing units, each supported by a multi-level cache hierarchy, share a common pool of resources, such as a system memory and input/output (I/O) subsystem, which are often coupled to a shared system interconnect.

Although SMP computer systems permit the use of relatively simple inter-processor communication and data sharing methodologies, SMP computer systems have limited scalability. For example, many SMP architectures suffer to a certain extent from bandwidth limitations, especially at the system memory, as the system scale increases.

An alternative MP computer system topology known as non-uniform memory access (NUMA) has also been employed to addresses limitations to the scalability and expandability of SMP computer systems. A conventional NUMA computer system includes a switch or other global interconnect to which multiple nodes, which can each be implemented as a small-scale SMP system, are connected. Processing units in the nodes enjoy relatively low access latencies for data contained in the local system memory of the processing units' respective nodes, but suffer significantly higher access latencies for data contained in the system memories in remote nodes. Thus, access latencies to system memory are non-uniform. Because each node has its own resources, NUMA systems have potentially higher scalability than SMP systems.

Regardless of whether an SMP, NUMA or other MP data processing system architecture is employed, it is typical that each processing unit accesses data residing in memory-mapped storage locations (whether in physical system memory, cache memory or another system resource) by utilizing real addresses to identifying the storage locations of interest. An important characteristic of real addresses is that there is a unique real address for each memory-mapped physical storage location.

Because the one-to-one correspondence between memory-mapped physical storage locations and real addresses necessarily limits the number of storage locations that can be referenced by software, the processing units of most commercial MP data processing systems employ memory virtualization to enlarge the number of addressable locations. In fact, the size of the virtual memory address space can be orders of magnitude greater than the size of the real address space. Thus, in a conventional systems, processing units internally reference memory locations by the virtual (or effective) addresses and then perform virtual-to-real address translations (often via one or more intermediate logical address spaces) to access the physical memory locations identified by the real addresses.

Given the availability of the above MP systems, one further development in data processing technology has been the introduction of parallel computing. With parallel computing, multiple processor nodes are interconnected to each other via a system interconnect or fabric. These multiple processor nodes are then utilized to execute specific tasks, which may be individual/independent tasks or parts of a large job that is made up of multiple tasks. In these conventional MP systems with separate nodes connected to each other, there is no convenient support for tasks associated with a single job to share parts of their address space across physical or logical partitions or nodes.

Shared application processing among different devices provides a very rudimentary solution to parallel processing. However, with each of these systems, each node operates independently of each other and requires access to the entire amount of resources (virtual address space mapped to the local physical memory) for processing any one job, making it difficult to productively scale parallel computing to a large number of nodes.

SUMMARY OF ILLUSTRATIVE EMBODIMENTS

Disclosed are a method, computer program product, and data processing system for issuing global shared memory (GSM) operations from an originating task on a first node coupled to a network fabric of a distributed network via a host fabric interface (HFI). The originating task generates a GSM command within an effective address (EA) space of the originating task. The task then places the GSM command within a send FIFO allocated to the originating task. The send FIFO is a portion of real memory having real addresses (RA) that are memory mapped to EAs of a globally executing job. The originating task maintains an EA-to-RA mapping of only a portion of the real address space of the globally executing job. The task enables the HFI to retrieve the GSM command from the send FIFO into an HFI window allocated to the originating task. The HFI window utilizes information from the GSM command to generate a GSM packet that contains at least one of GSM operations and data, and the HFI window issues the GSM packet to the network fabric.

In one embodiment, the task maintains a send FIFO counter, which tracks a number of GSM operations within the send FIFO. Responsive to the placing of the GSM command, the task automatically updates the counter. The task also compares a value of the counter against a pre-established threshold number, and when the counter value is at least as high as the pre-established threshold number, the task signals the HFI to alert HFI logic to retrieve GSM commands from within the send FIFO. In one embodiment, the task places the GSM command in the send FIFO by performing an MMIO store of the task.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3A and 3B illustrates two example allocations of global address space (GAS) among multiple tasks of a job to enable GSM operations, according to alternate embodiments of the invention;

DETAILED DESCRIPTION OF AN ILLUSTRATIVE EMBODIMENT

Figure 1:
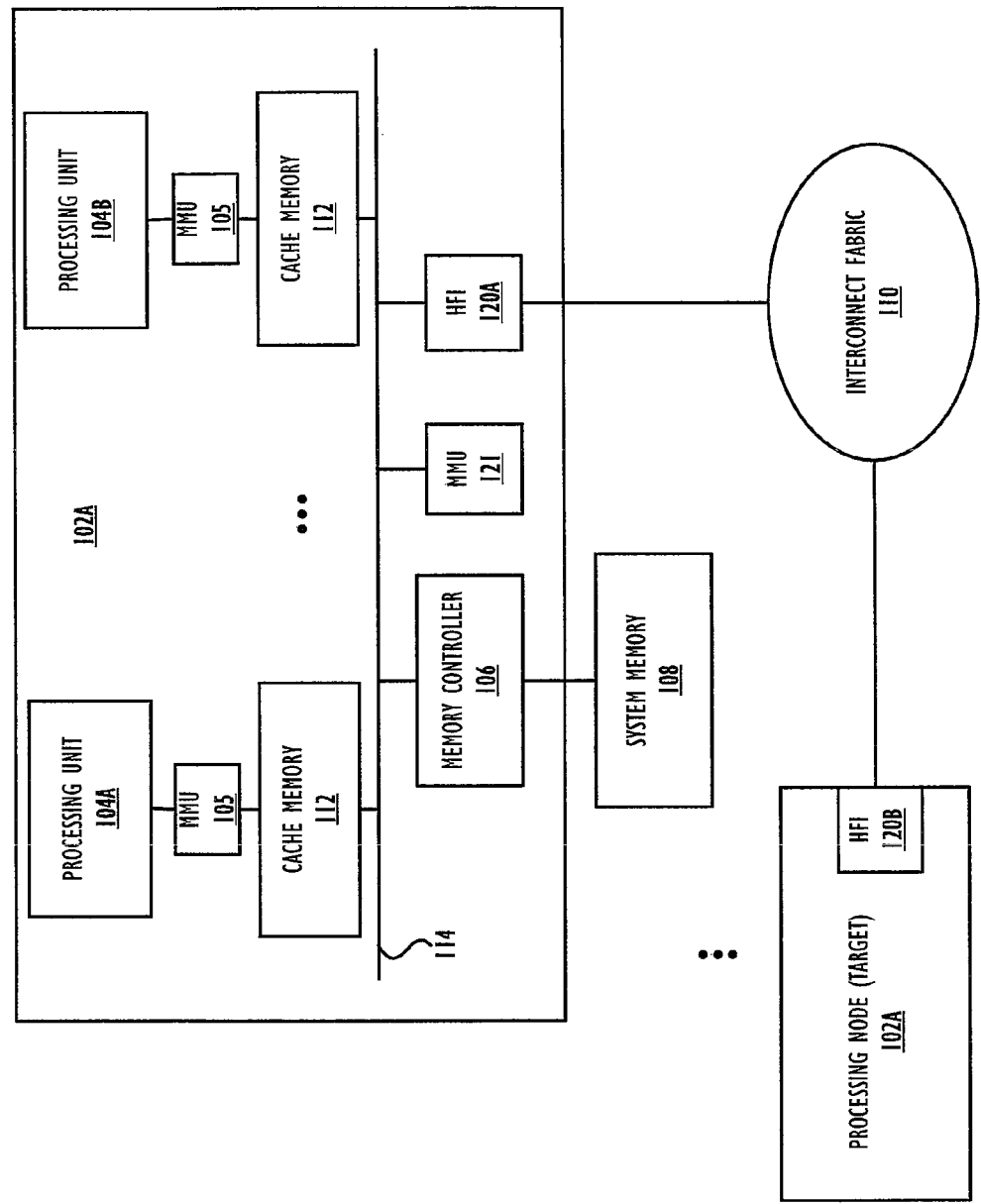
FIG. 1 illustrates an example multi-node data processing system with a host fabric interface (HFI) provided at each node to enable GSM processing across the nodes, according to one embodiment of the invention.

The illustrative embodiments provide a method and data processing system for generating and processing global shared memory (GSM) operations that complete parallel job execution of multiple tasks on different physical nodes with distributed physical memory that is accessible via a single, shared, global address space (GAS). Each physical node of the data processing system has a host fabric interface (HFI), which includes one or more HFI windows with each window assigned to at most one locally-executing task of the parallel job, although multiple windows may be assigned to a single task. The HFI includes processing logic for completing a plurality of operations that enable parallel job execution via the different tasks, each of which maps only a portion of the effective addresses (EAs) of the shared GAS to the local (real or physical) memory of that node. Each executing task within a node is assigned a window within the local HFI. The window ensures that issued GSM operations (of the local task) are correctly tagged with the job ID as well as the correct target node and window identification at which the operation is supported (i.e., the EA is memory mapped). The window also enables received GSM operations with valid EAs in the task to which the window is assigned to be processed when received from another task executing at another physical node, while preventing processing of received operations that do not provide a valid EA to local memory mapping.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention.

The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the following terms, which are utilized herein, are defined as follows:

(1) Effective, virtual, and real address spaces: a user-level program uses effective addresses (EAs), which are translated into operating system (OS)-specific virtual addresses (VAs). The OS and the hardware memory management units (MMUs) translate VAs into real addresses (RAs) at the time of use.
(2) Node: the set of computing resources that form the domain of a coherent operating system (OS) image.
(3) Cluster: a collection of two or more nodes.
(4) System: the collection of all nodes in the cluster domain.
(5) Parallel Job: an application that executes on some or all the nodes in a cluster. A job is made up of tasks (processes), each of which executes in a node domain in the cluster. A parallel job has various attributes including a job ID that uniquely identifies the parallel tasks that comprise the parallel job in the entire system.
(6) Task: a single process that executes within a single effective address (EA) space. By definition, a task executes wholly within a node. However, multiple tasks in a parallel job may execute on the same node (typically proportional to the number of CPUs on the node). A task can include one or more threads of control that all view and share the same effective address (EA) space.
(7) Global shared memory (GSM)-enabled job: a parallel job, in which the component tasks have arranged to make parts of their individual effective address (EA) spaces accessible to each other via global shared memory (GSM) operations.
(8) Global address space (GAS): the union of all effective addresses (EAs) in a GSM job that are accessible to more than one task via GSM operations.
(9) Global address: an effective address within a task described as <T, EA> that is accessible to other tasks.
(10) Home: the specific node where a particular location in the global address space (GAS) is physically allocated in physical memory. Every location in the GAS has exactly one home.

As further described below, implementation of the functional features of the invention is provided within computing nodes and involves use of a combination of hardware and several software-level constructs. The presented figures illustrate both hardware and software components within an example GSM environment in which two physically separate nodes, interconnected via respective HFIs and an interconnect, provide a data processing system that executes a parallel job as individual tasks that utilize a GSM. The presentation herein of only two nodes, i.e., an initiating (sending) node and a target (receiving) node, is provided solely to simplify the description of the functionalities associated with GSM operations and the HFI. It is appreciated that this GSM functionality enables scaling to a much larger number of processing nodes within a single data processing system.

With specific reference now to the figures, and in particular to FIG. 1A, there is illustrated a high-level block diagram depicting a first view of an exemplary data processing system 100 configured with two nodes connected via respective host fabric interfaces, according to one illustrative embodiment of the invention, and within which many of the functional features of the invention may be implemented. As shown, data processing system 100 includes multiple processing nodes 102A, 102B (collectively 102) for processing data and instructions. Processing nodes 102 are coupled via host fabric interface (HFI) 120 to an interconnect fabric 110 that supports data communication between processing nodes 102 in accordance with one or more interconnect and/or network protocols. Interconnect fabric 110 may be implemented, for example, utilizing one or more buses, switches and/or networks. Any one of multiple mechanisms may be utilized by the HFI 120 to communicate across the interconnect 110. For example, and without limitation, HFI 120 may communicate via a proprietary protocol or an industry standard protocol such as Inifiniband, Ethernet, or IP (Internet Protocol).

As utilized herein, the term "processing node" (or simply node) is defined as the set of computing resources that form the domain of a coherent operating system (OS) image. For clarity, it should be understood that, depending on configuration, a single physical system may include multiple nodes. The number of processing nodes 102 deployed in a given system is implementation-dependent and can vary widely, for example, from a few nodes to many thousand nodes.

Each processing node 102 may be implemented, for example, as a single integrated circuit chip (e.g., system-on-a-chip (SOC)), a multi-chip module (MCM), or circuit board, which contains one or more processing units 104 (e.g., processing units 104A, 104B) for processing instructions and data. Further, each processing unit 104 may concurrently execute one or more hardware threads of execution.

As shown, each processing unit 104 is supported by cache memory 112, which contains one or more levels of in-line or lookaside cache. As is known in the art, cache memories 112 provide processing units 104 with low latency access to instructions and data received from source(s) within the same processing node 102a and/or remote processing node(s) 102b. The processing units 104 within each processing node 102 are coupled to a local interconnect 114, which may be implemented, for example, with one or more buses and/or switches. Local interconnect 114 is further coupled to HFI 120 to support data communication between processing nodes 102A, 102B.

As further illustrated in FIG. 1A, processing nodes 102 typically include at least one memory controller 106, which may be coupled to local interconnect 114 to provide an interface to a respective physical system memory 108. In alternative embodiments of the invention, one or more memory controllers 106 can be coupled to interconnect fabric 110 or directly to a processing unit 104 rather than a local interconnect 114.

In addition to memory controller, each processing unit 104 also includes a memory management unit (MMU) 105 to translate effective addresses to real (or physical) addresses. These MMUs 105 perform EA-to-RA translations for tasks executing on processing nodes (e.g., node 102A) of data processing system 100. However, the invention also uses a separate MMU 121, which is coupled to the local interconnect 114. MMU 121 performs EA-to-RA translations for operations received from tasks operating on remote processing nodes (e.g., node 102B) of data processing system 100. In one implementation of processor configurations, MMU 121 may be integrated with HFI 120 so as to support EA-to-RA address translations required by HFI and/or tasks utilizing HFI to complete GSM operations.

The HFI 120A and functional components thereof, which are described below, enables the task(s) executing on processing units 104a/104b to generate operations to access the physical memory 108B of other nodes that are executing other tasks of the parallel job using EAs from a shared global address space (GAS) and a GSM. Likewise, HFI 120B enables access by the task(s) on initiating node 102A to access physical memory 108B when certain criteria are met. These criteria are described below with reference to FIGS. 4 and 9

Those skilled in the art will appreciate that data processing system 100 of FIGS. 1A and 1B can include many additional components, which are not illustrated herein, such as interconnect bridges, non-volatile storage, ports for connection to networks or attached devices, etc. Because such additional components are not necessary for an understanding of the present invention, they are not illustrated in FIG. 1A or 1B or discussed further herein.

The above described physical representations of nodes of an example data processing systems 100 with HFIs supports the distribution of tasks associated with a parallel job across multiple nodes within a larger system with a GSM. FIG. 2 illustrates a high level view of processing multiple tasks of a parallel job within an exemplary software environment for data processing system 100, in accordance with one embodiment. In the exemplary embodiment, data processing system 100 includes at least two physical systems 200a and 200b (which respectively provide processing nodes 102a and 102b of FIG. 1) coupled by interconnect fabric 110. In the depicted embodiment, each physical system 200 includes at least two concurrent nodes. That is, physical system 200a includes a first node corresponding to operating system 204a1 and a second node corresponding to operating system 204a2. Similarly, physical system 200a includes a first node corresponding to operating system 204b1 and a second node corresponding to operating system 204b2. The operating systems 204 concurrently executing within each physical system 200 may be homogeneous or heterogeneous. Notably, for simplicity, only one node of each physical system is utilized in the descriptions of the GSM and HFI functions herein, although the features of the invention are fully applicable to tasks executing on any one of multiple nodes on a single physical system accessing physical memory of other nodes on other physical system(s).

Each physical system 200 may further include an instance of a hypervisor 202 (also referred to as a Virtual Machine Monitor (VMM)). Hypervisor 202 is a program that manages the full virtualization or para-virtualization of the resources of physical system 200 and serves as an operating system supervisor. As such, hypervisor 202 governs the creation and destruction of nodes and the allocation of the resources of the physical system 200 between nodes.

In accordance with the present invention, the execution of parallel jobs in data processing system 100 is facilitated by the implementation of a new shared memory paradigm referred to herein as global shared memory (GSM), which enables multiple nodes executing tasks of a parallel job to access a shared effective address space, referred to herein as a global address space (GAS).

Thus, under the GSM model employed by the present invention, data processing system 100 can execute multiple different types of tasks. First, data processing system 100 can execute conventional (individual) Tasks C, F, G, K, L, P, Q, T, V and W, which are independently executed under operating systems 204. Second, data processing system 100 can execute parallel jobs, such as Job 2, with tasks that are confined to a single node. That is, Tasks D and E are executed within the node corresponding to operating system 204a1 of physical system 200a and can coherently share memory. Third, data processing system 100 can execute parallel jobs, such as Job 1, that span multiple nodes and even multiple physical systems 200. For example, in the depicted operating scenario, Tasks A and B of Job 1 execute on operating system 204a1, Tasks H and J of Job 1 execute on operating system 204a2, Tasks M and N of Job 1 execute on operating system 204b1, and Tasks R and S of Job 1 execute on operating system 204b2. As is illustrated, tasks of multiple different jobs (e.g., Job 1 and Job 2) are permitted to concurrently execute within a single node.

With standard task-to-task operation, tasks running on a same node, i.e., tasks homed on the same physical device, do not need to utilize the HFI and resolve EA-to-RA mapping beyond the standard page table. The HFI and/or MMU components are thus not utilized when exchanging operations across tasks on the same physical node. Where tasks are running on different physical nodes, however, the use of the MMU and HFI is required to enable correct EA-to-RA translations for tasks homed at the specific node when issuing and/or receiving GSM operations.

Additional applications can optionally be executed under operating systems 204 to facilitate the creation and execution of jobs. For example, FIG. 2 depicts a job management program 206, such as LoadLeveler, executing under operating system 204a1 and a runtime environment 208, such as Parallel Operating Environment (POE), executing under operating system 204a2. LoadLeveler (206) and Parallel Operating Environment (208) are both commercially available products available from International Business Machines (IBM) Corporation of Armonk, N.Y. LoadLeveler (206) and POE (208) can be utilized as a convenience to the user, but are not required. However, the described embodiment provides for the availability of a privileged program to both bootstrap non-privileged executables on the cluster nodes and to enable the non-privileged executables to request and use node resources.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa.

A. Task Generation and Global Distribution

Figure 6:
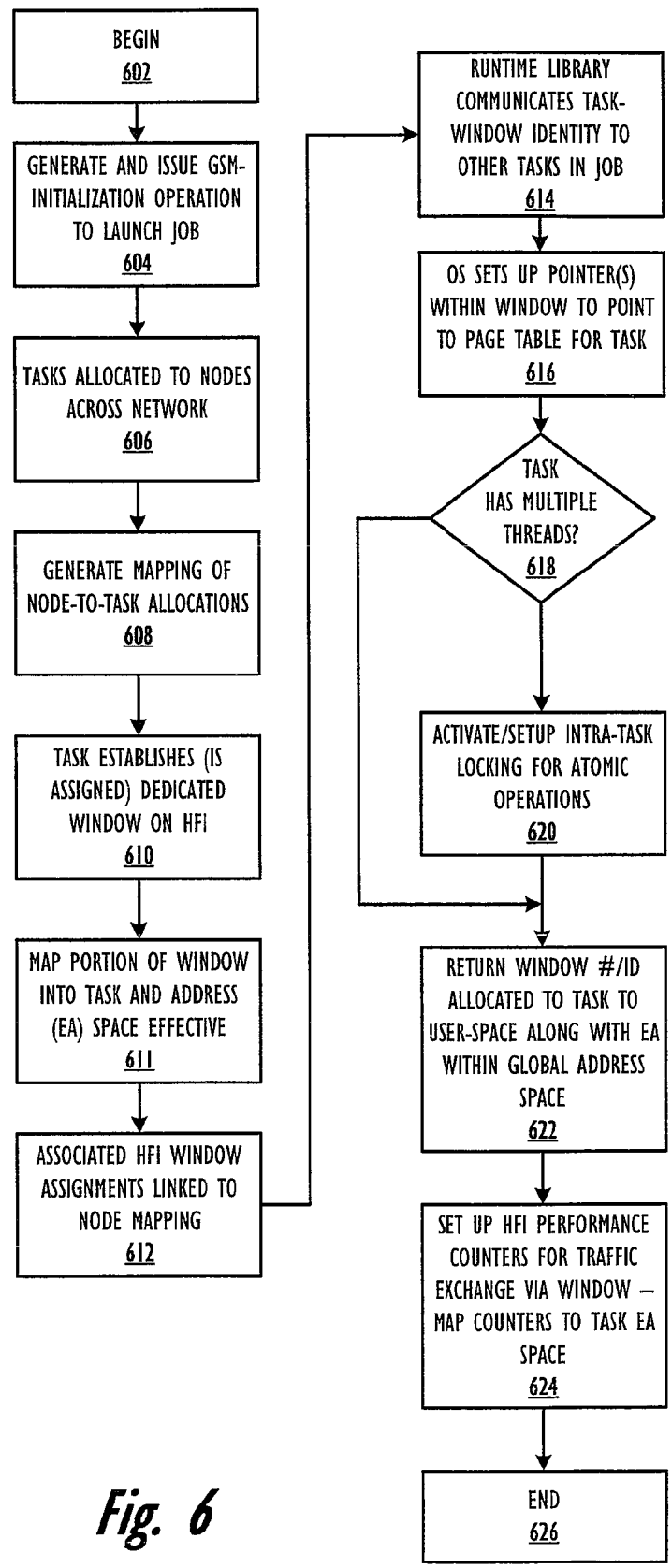
FIG. 6 is a flow chart of the method of initiating/establishing a job within the GSM environment, including allocating tasks to specific nodes and assigning windows within the HFI, in accordance with one embodiment of the invention.

The method for generating and distributing the tasks of a job (e.g., Job 1, illustrated in FIG. 2), are described in FIG. 6. The executable of the program is supplied to the job management program 206, with user-supplied execution attributes in a job command file. These attributes include the number of nodes on which the job needs to execute. The job management program 206 generates a job ID (that is unique system-wide) and selects a set of nodes in the system on which to execute the parallel job. The job management program 206 then invokes the runtime system 208 for parallel jobs (e.g., (POE)). The runtime system 208 in turn spawns the user executable on the set of nodes that the job management program 206 allocated for the parallel job, and the runtime system 208 sets up state that permits each task to determine the task's unique rank ordering within the parallel job. For example, in a job with N tasks, exactly one task will have the rank order i, where 0<=i<N. The runtime system 208 also provides the mapping (in the form of a table) between the tasks and the physical nodes on which the tasks are executing. Setup operations performed by the job management program 206 also permit the tasks to access interconnect resources on each cluster node.

Figure 3A:
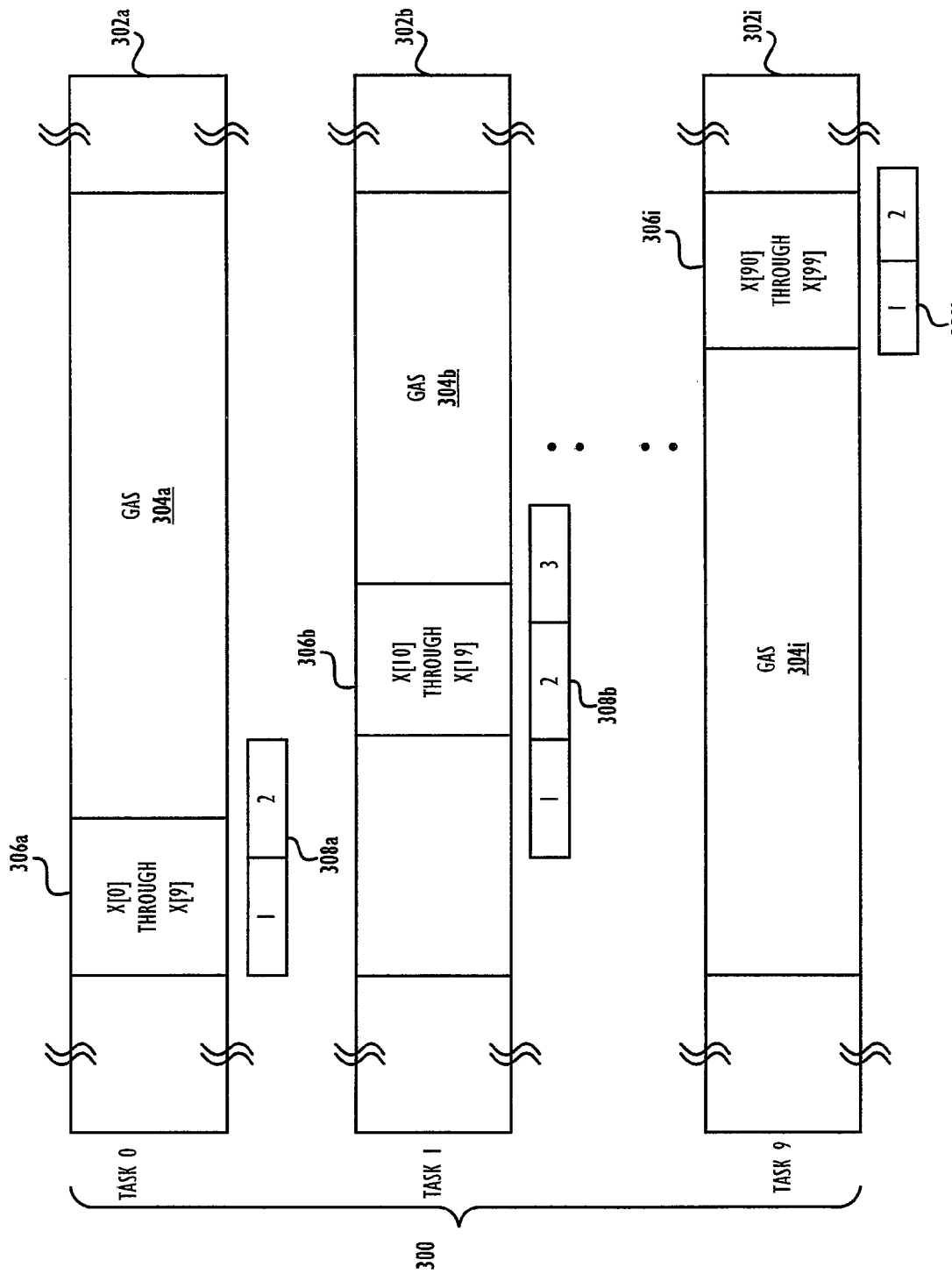

In order to complete the processing by the HFI and other functional features of the invention, a system-level establishment (or system allocation) of the global shared memory is required. FIGS. 3A-3B illustrate two embodiments of assigning tasks to address spaces within the global address space during setup/establishment of the GSM environment. The complete description of this process is presented within co-pending patent applications, U.S. application Ser. Nos. 11/958,668 and/or 11/958,956. Relevant content of those applications are incorporated herein by reference.

During initialization of the tasks of a parallel job, each task issues a system call to set up the global address space. In addition to reserving effective address space, the system call also accomplishes two additional tasks. First, the call initializes a HFI window hardware structure in preparation for usage in the global shared memory model. Second, the system call creates a send FIFO and a receive FIFO, which allow the task to send active messages to one another via the node's HFI.

Once the global address space has been initialized, individual tasks can allocate physical memory that can be globally addressed by all tasks of the job. Memory allocation on each task is achieved through a second system call, which specifies the amount of memory to be allocated, as well as the effective address within the already-reserved global address space (GAS) where the allocated memory must appear. All allocations are done locally with respect to the task issuing the second system call. Once allocation is completed, all threads within the locally-executed task can access the allocated memory using load and store instructions.

In order to use the GSM feature, each of the group of tasks for the job has to communicate the results of the first system call and co-ordinate amongst each other the arguments to the second system call invocation. FIG. 6, described below, illustrates the method by which these inter-task coordination of system calls are completed.

Referring now to FIG. 3A, there is depicted a representation of an exemplary effective address space of tasks of a parallel job following the establishment of the GAS. In the exemplary embodiment, parallel job 300 comprising ten tasks, labeled Task 0 though Task 9. Each of the ten tasks is allocated a respective one of effective address (EA) spaces 302A-302i by its operating system 204. These effective address spaces are allocated to each task independent of the existence of the other tasks. After each task issues an initialization system call, a portion of the effective address (EA) space on that task is reserved for use exclusively for performing global shared memory (GSM) allocations, as illustrated at reference numerals 304A-304i.

With reference now to FIG. 3B, there is illustrated a representation of an exemplary effective address space of tasks comprising a parallel job following the allocation of memory in the GAS 304A-304i. In the depicted example, the allocation for a shared array X[ ] distributed across the GAS 304A-304i is shown. In particular, region 306A is allocated to X[0]-X[9] in GAS 304A of Task 0, region 306B is allocated to X[10]-X[19] in GAS 304B of Task 1, and so on until finally X[90]-X[99] is allocated in region 306i of GAS 304i. The portions of X[ ] allocated to the GAS 304 of a task are homed on the node executing that task. Physical memory 308A-308i is further allocated on each task's node to back the portion of X[ ] homed on that node.

FIGS. 3A and 3B provide two alternative methods though which the array x[ ] can be allocated. For instance, as shown in FIG. 3A, array x[ ] can be allocated such that the array can be accessed with contiguous effective addresses within the global address space of all ten (10) tasks participating in the parallel job. The global address space can also be caused to begin at the same effective address on each task, through the co-ordination of arguments to the second system call invocation. FIG. 6, described later, illustrates the method by which these inter-task coordination of system calls are completed. Shared array x[ ] can also be allocated in a non-contiguous manner within the global address space. Finally, the global address space can start at different effective addresses within the tasks.

For the allocations in FIGS. 3A and 3B, the operating system of the node on which each task executes only allocates backing memory for those portions of the task global address space that are homed on that node. Elements 308a through 308i in each figure show how the physical memory may be allocated to store the portion of the array x[ ] homed at that node. As shown, for tasks 0, 1, and 9, the allocation in FIG. 3A takes seven physical pages while that in FIG. 3B takes six physical pages. Every access to a shared variable in a GSM application must be translated into a tuple of the form <T, EA>, where EA is the effective address on task T where the location is homed.

Practicality in data structure placement is a very important consideration since practicality can have a huge impact on the amount of physical memory required to support the allocation. For instance, if the programmer specifies that the shared array x should be distributed in a cyclic manner, an extensive amount of fragmentation and wasted physical memory will result if the array were to be allocated such that the array can be contiguously addressed within the global address space. For such an allocation, savings in the amount of physical memory required to back up the homed portions of x[ ] would be achieved by compacting the data structure. The GSM feature described herein thus provides applications with considerable flexibility in deciding how to map global data structures. As FIGS. 3A 3B show, simplicity in determining where a shared element is homed can be traded off against the fragmentation costs of the chosen mapping scheme.

Using the above allocation of GAS to tasks of a job, the embodiments of the invention enables a job to be scaled across a large number of nodes and permits applications to globally share as large a portion of the application's effective address space as permitted by the operating system on each node. Also, no restrictions are imposed on where the tasks of a job must execute, and tasks belonging to multiple jobs are allowed to execute concurrently on the same node.

B. HFI, HFI Window, Send and Receive FIFO, MMU and Memory Mapping

Figure 2:
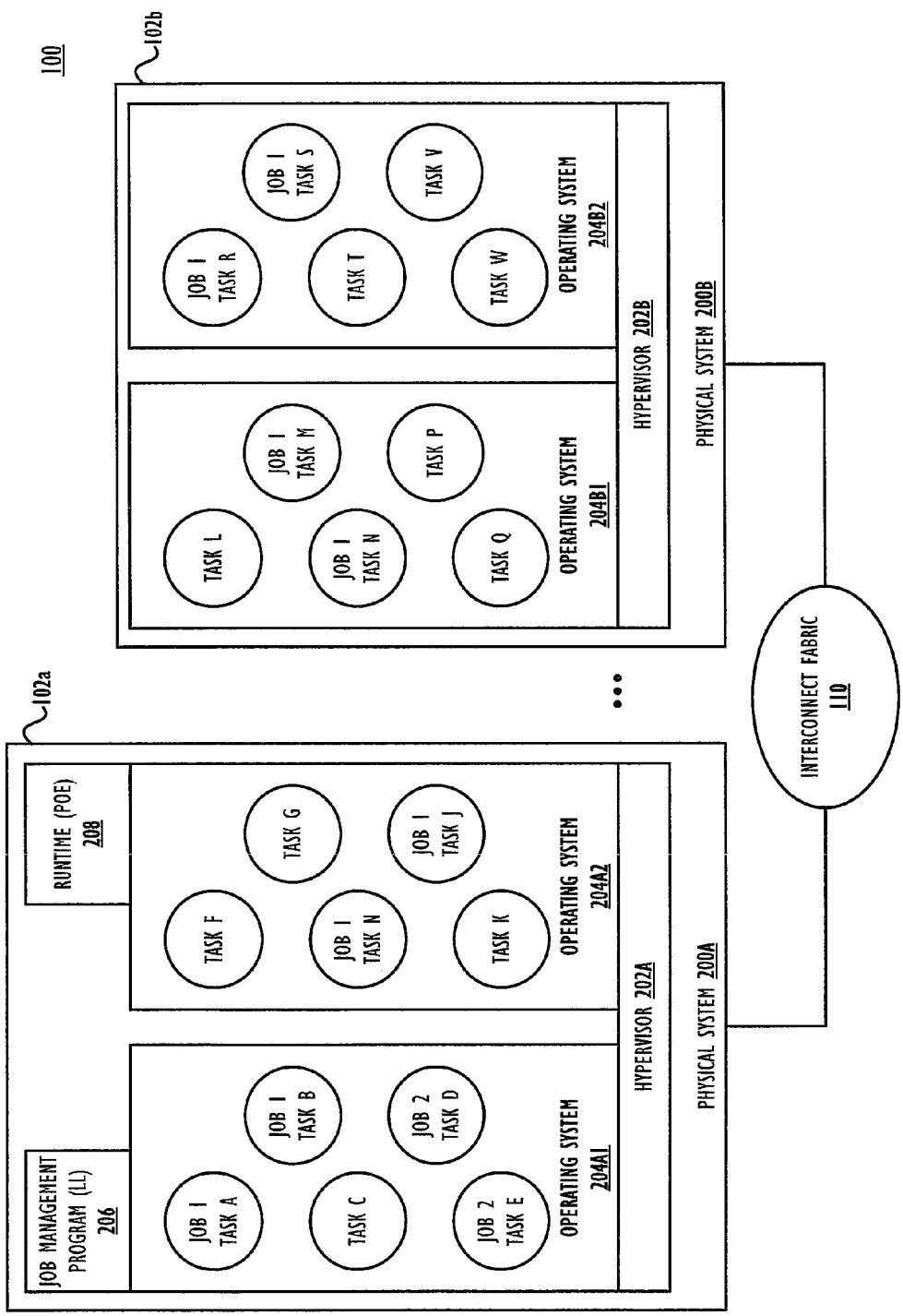
FIG. 2 illustrates the allocation of tasks of a single job across partitions and nodes within a multi-node GSM environment (such as data processing system of FIG. 1), according to one embodiment of the invention.
Figure 4:
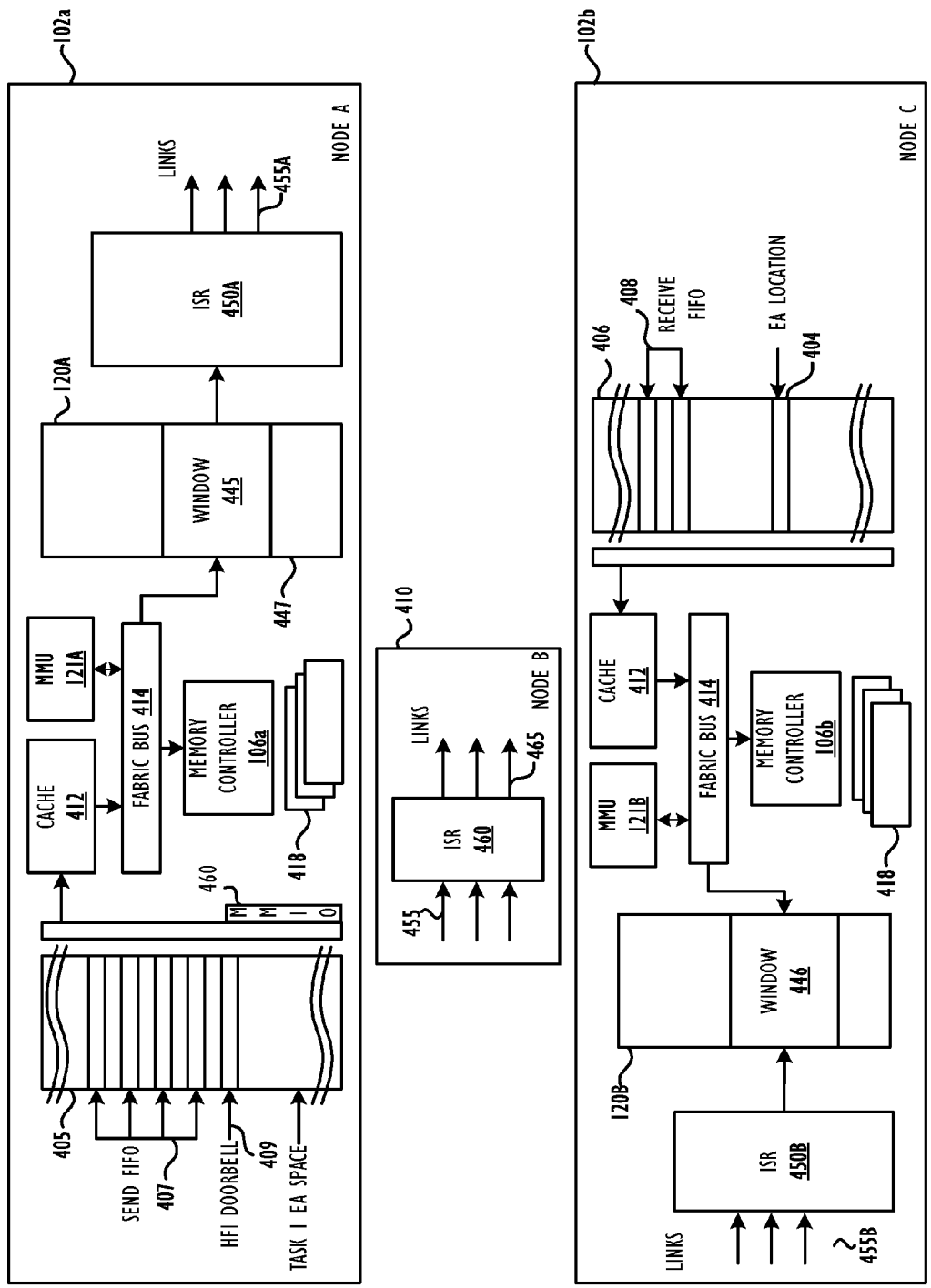
FIG. 4 is a block diagram illustrating components of an example send (initiating) node and target node utilized for processing of GSM operations, according to one embodiment of the invention.

Referring now to FIG. 4, there is illustrated another more detailed view of the data processing system 100 of FIGS. 1 and 2 with the hardware (and software) constructs required for generation, transmission, receipt and processing of GSM operations across physical nodes within the GSM environment. First computer node 102a (initiating or sending node) and second computer node 102b (target or receiving node)

includes HFI 120a, 120b, respectively. HFI 120 is a hardware construct that sits on the coherent fabric within a (processor) chip. Each HFI 120 provides one or more windows 445 (and 446) (see FIG. 5) allocated to a particular executing task of a parallel job.

When an executing task of a parallel job issues an initialization system call, the operating system (OS) of that node attempts to establish a dedicated window on the HFI for that task. If the operation succeeds, a portion of the allocated HFI window is first mapped into the task's address space. The memory mapped IO (MMIO) space 460 includes a command area and FIFO pointers. After the appropriate portion of the task's effective address space is reserved (i.e., mapped to the physical memory), the operating system sets up the window to point to the page table for that task so that effective addresses within inbound (i.e., from the interconnect 410) GSM commands can be translated.

In processing system 100, first node 102a represents the sending/initiating node and is illustrated with send FIFO 407 within memory 405 that is accessible via a MMIO 460. Second node 102b represents the receiving or target node and is illustrated with receive FIFO 408 within its memory 406. It is understood that even though an asymmetric view is shown, both processing nodes 102a and 102b are similarly configured, having both send FIFO 407 and receive FIFO 408, and each node is capable of performing both send and receive functions. Within processing system, 100, the HFI 110 is the primary hardware element that manages access to the interconnect (410). The interconnect is generally represented by links 455a, 455b routing switch 410, and a series of switch elements 450A, 450B and 460. HFI 120A thus enables a task executing on sending node (120a) to send GSM operations (with a destination or target identified by the job ID, node ID and window ID) to a receiving/target node 102b.

As further illustrated in FIG. 4, processing nodes 102 include at least one memory controller 106, which is coupled to local fabric 414 to provide an interface between HFI 120 and respective physical system memory (DIMMs) 418. Processing nodes 102 also include MMU 121, which is coupled to fabric bus 414. MMU 121 may be a part of (i.e., integrated into) HFI 120 and provides the EA-to-RA translation required for GSM operation processing by the HFI 120. Coupled to fabric bus 414 is processor cache 412, which is in turn connected to processing units of the central processor. Also illustrated is (form the perspective of the executing task), a view of the mapping of EAs to physical memory space 405 allocated to the executing task. Within this virtual view of the physical memory is a send FIFO 407 which is used to store commands and data generated by the task, prior to being processed by HFI 120 to generate GSM operations. Also illustrated is HFI doorbell 409, which is a mechanism that tracks the number of operations within send FIFO, and is utilized to alert the HFI 120 when to retrieve operations from the send FIFO 407. Similarly, receive FIFO 408 of target node 102b is located within physical memory 406, in which an EA mapping location 404 is also identified for reference.

The HFI window 445 and 446 provide a task-level view into the node's hardware that enables GSM commands to be launched with regards to a particular task's effective address space (302) and for the effective addresses (EA) contained within commands to be appropriately translated. HFI windows 445 are basic system constructs used for GSM operations. Each HFI 120 may contain multiple windows 445, and each window is allocated to a single task of the one or more tasks executing on the computer node 102.

Figure 5:
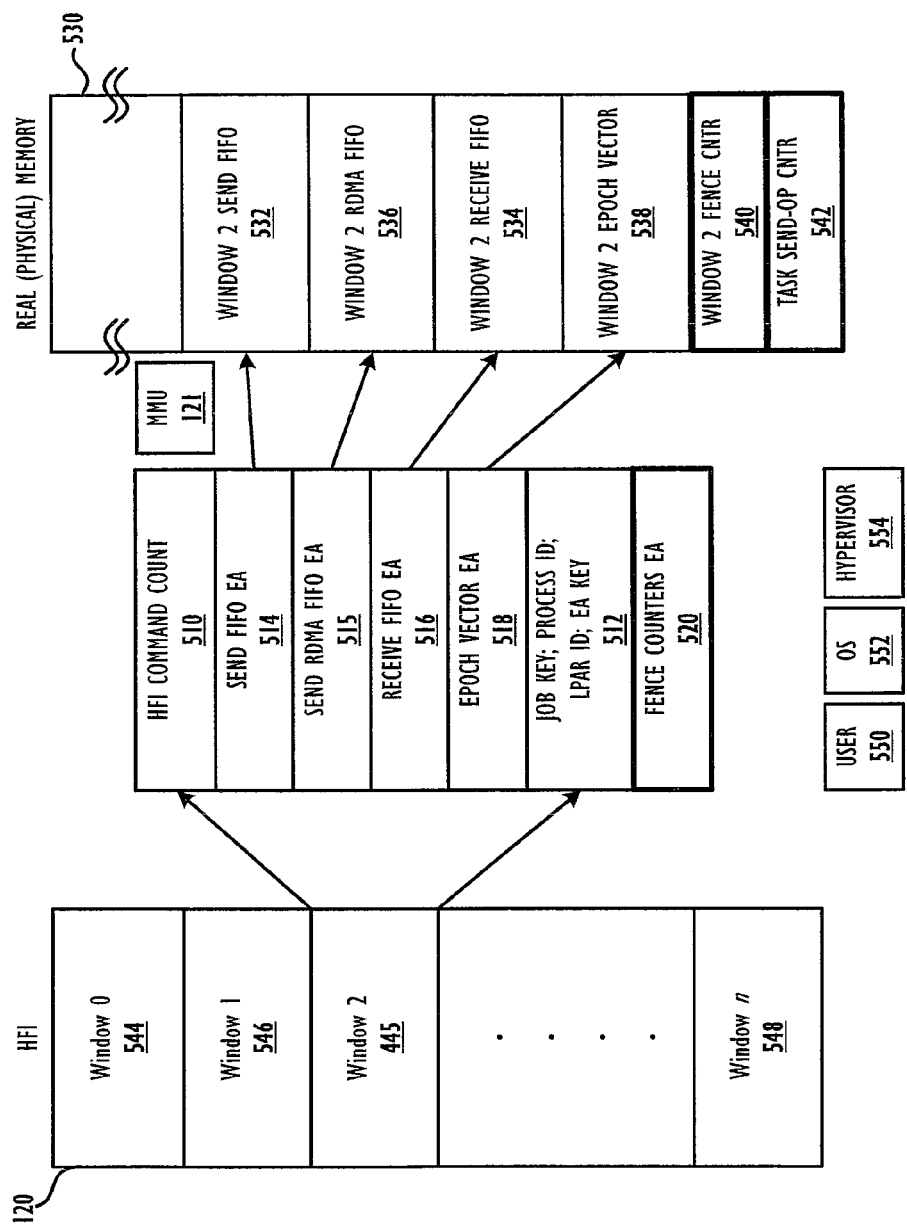
FIG. 5 illustrates a detailed view of an example HFI window and the association of window entries to specific memory locations within the real (i.e., physical) memory, in accordance with one embodiment of the invention.

Further functional characteristics of example HFI windows 445 are illustrated by FIG. 5, which is now described.

As shown by FIG. 5, HFI 120 consists of a plurality of windows (window0 through windowN) of which HFI window2 445 is selected as the example window. Each HFI has a fixed number of windows, each of which can belong to exactly one task, although more than one window may be assigned to a task. The window assigned to a task is used by the HFI 120 to both launch GSM messages originating from the task as well as handle incoming messages accessing that task's effective address space. HFI window 445 is accessible by task-generated commands, which may be generated at different functional levels, including by a user 550, an OS 552, and/or a hypervisor 554.

HFI window 445 consists of a plurality of functional entries, such as command entries, credentials entry, an address translation entry, and data structures used by the HFI to control message transmission and reception. Specifically, as illustrated, window2 445 comprises the following entries, without limitation, HFI command count 510, send FIFO EA 514, SEND RDMA FIFO EA 515, receive FIFO EA 516, epoch vector EA 518, credentials 512, and fence counters 520. In the illustrative embodiment, credentials 512 includes the job ID (also referred to herein as a job key), process ID, LPAR (logical partition) ID and EA key. The HFI references the credentials 512 to correctly authenticate an incoming GSM transaction as being authorized to perform an operation on the associated task's effective address space. It is appreciated that the different components of credentials 512 may also be represented with its own entry within HFI window 445. Each of the above entries are registers providing a value of a memory location at which the named entry is stored or at which the named entry begins (i.e., a start location) within the effective address space of the task. These effective addresses are translated by MMU 121 into corresponding real addresses that are homed within the physical memory 530. HFI forwards one of the effective addresses of Window contents to MMU 121, and MMU 121 translates the effective address into a real address corresponding to the physical memory 530 to which the EAs of the task identified by the credentials are mapped.

HFI window 445 also comprises one or more fence counters 520 for tracking completion of GSM operations during a local fence operation and a global fence operation. The fence counters 520 referenced by the EAs in map to fence counter 540 within the real memory location assigned to the task. In order to assist with local (task-issued) fence operations, the RA space assigned to the task also includes a send-op counter 542 to track the completion of task-issued commands, which are initially stored in send FIFO 532, before passing to HFI window for processing.

Thus, as further illustrated, send FIFO EA 514 holds the start effective address for the task's send FIFO (First In First Out) buffer, which address can be translated by MMU 121 to point to the start (real address) of send FIFO 532 in physical memory 530. Likewise, receive FIFO EA 516 holds the start EA of the task's receive FIFO 534, which address is translated by MMU 121, and points to the start address in physical memory 530 of the receive FIFO 534 of the task. The SEND RDMA (Remote Direct Memory Access) FIFO EA 515 and epoch vector EA 518 similarly can be translated by MMU 121 to point to the start real addresses of the SEND RDMA FIFO 536 and Epoch vector 538, respectively. Note that while the send FIFO 514 and receive FIFO 516 may be contiguous in the effective address space of the task to which that window corresponds, these FIFOs (514, 516) may be discontiguous in real (physical) memory 530.

Each HFI window contains key resources including the pointer to the address translation tables that are used to resolve the effective address (with respect to a particular task) into a real address. The window number within the HFI that is allocated for the GSM initialization operation is returned back to the user as an opaque handle, which may contain an encoding (embedding) of the node and window number, along with the effective address where the global address space is reserved within that task's effective address space. The language run-time takes on the responsibility for communicating each task's effective address space. The language run-time takes to issue GSM commands to that task. If a task has multiple threads of control, atomicity to the HFI window has to be ensured either through normal intra-task locking primitives, or by assigning each thread its own distinct HFI window. Finally, HFI performance counters for all traffic based on that window are also mapped into the task's address space. This permits the task to easily monitor statistics on the interconnect traffic.

HFI windows may be shared amongst one or more logical partitions. If a single node is partitioned, the operating system running on a partition may only have access to a subset of the total number of supported windows. The OS may further reserve a subset of these windows for kernel subsystems such as the IP device driver. The remaining windows may be available for use by the tasks executing within that partition.

When a window is allocated on the HFI, the operating system tags the window with the identity of the job to which the task belongs. During issuance of GSM operations, all outgoing packets are automatically tagged by the HFI with the job id. Outgoing packets also specify a particular window on the destination/target node's HFI 120B in whose context the GSM effective address must be translated. The HFI compares the job ID contained within the GSM packet against the job id contained within the window. If the job ID's do not match, the packet is silently discarded. Statistics that count such packets can be used to gently dissuade system users from either unintentionally or maliciously flooding the system with such packets.

Thus, unauthorized access to a task's effective address space is not permitted during the course of global shared memory operations. A task is able to send a GSM operation to any task belonging to any job running anywhere in the entire system. However, the HFI will perform the GSM operations on the targeted task's effective address space if and only if an incoming GSM command belongs to the same job as the task whose address space the command manipulates. A further granulation of job IDs is also possible, whereby a task can give specific authorization to only a subset of the tasks executing within the job. This can be done by a subset of the tasks requesting a different job ID to be associated to them, causing that job ID to be installed into the HFI window associated with these tasks.

In order to fully appreciate the functionality of each of the above listed entries and the entries use during GSM operation to retrieve values from within physical memory 430, a description of the process of assigning a window to support a task of a parallel job is now provided. This process is illustrated by FIG. 6, which is now described. Generally, FIG. 6 is a flow chart of the method of initiating a job within the GSM environment and allocating the various tasks of the job to specific nodes and assigning a window within the HFI of those nodes to a task, according to one embodiment of the invention.

The process begins at block 602, and proceeds to block 604, at which an application generates and issues a GSM initialization operation to launch a parallel job. Initialization of the job leads to allocation of a plurality of tasks to certain nodes across the distributed network, as shown at block 606.

At block 608, mapping of these nodes with allocated tasks is generated and maintained at each node. At each local node with one of these tasks, before using global shared memory, the task establishes (or is assigned) a dedicated window on the HFI for that task, as provided at block 610. A portion of the allocated HFI window (including a command area and FIFO pointers—FIG. 5) is first mapped into the tasks effective address (EA) space as shown at block 611. The mapping of EA-to-RA for the task is provided to the MMU 121, for later use by the HFI during GSM processing. Additionally, the unique job key or job ID is embedded into the HFI window assigned to the task.

At block 612, the HFI window assignments for the various tasks are linked to a generated node mapping for the job, and then at block 614, the runtime library communicates task-window identity to other tasks in the job. This enables each task to be aware of the location of the other tasks and permits subsequent software operations that allocate memory to determine on which node a certain variable allocated in the global address space should be homed. After the appropriate portion of the task's effective address space is reserved, the operating system sets up the HFI window pointer(s) (page table pointer 522) to point to the page table for that task so that effective addresses within inbound (i.e., from the interconnect) GSM commands can be translated at the node, as indicated at block 616. Send and receive pointers (514, 516) are also established within the HFI window 445 that are translated to specific physical memory locations by MMU 121.

At decision block 618, the OS determines if the task has multiple threads. When a task has multiple threads of control, the OS ensures atomicity to the HFI window through normal intra-task locking primitives, as shown by block 620. Alternatively, a task may request a separate window for each of its threads. At block 622, the window number within the HFI 110 that is allocated during the GSM initialization operation is returned back to the user space (task) 550 as an opaque handle, along with the effective address where the global address space is reserved within that task's effective address space. Finally, at block 624, HFI performance counters for all traffic based on that window are also mapped into the tasks effective address space. This setup of performance counters permits the task to easily monitor statistics on the interconnect traffic. The process then ends at termination block 626.

C. GSM Operations

After a global address space is established and memory allocated as generally described above (FIG. 6), each task is able to perform the following basic operations: (1) Reads or "gets" to memory; (2) Writes or "puts" to memory; and (3) Restricted atomic operations such as those belonging to the set {ADD,AND,OR,XOR,COMPARE_AND_SWAP, FETCH_AND_OP}. Ultimately, all GSM operations are relayed by interconnect messages to (and from) the nodes where a memory location is homed. The basic GSM operations listed above therefore need to be converted into interconnect messages that are processed at the appropriate home node. Furthermore, any response messages also need to also be processed at the sending node (i.e., the node receiving a response from a target node for a previously sent GSM operation). The HFI, and specifically the HFI window allocated to the particular task, is utilized to provide the hardware support for these and other GSM-related functions. GSM commands are transmitted by a task to the HFI by simply writing to the memory mapped address space.

The below described embodiments enables different tasks in a (parallel) job to perform operations efficiently on the global address space of the parallel job by using a HFI to issue GSM operations across the fabric of the GSM environment.

Among the operations that are performed are reads, writes, certain types of atomic operations, and higher level operations that can be constructed using one or more of these basic operations. Within GSM task execution, all operations refer to effective addresses within the constituent tasks of the GSM job. GSM operations are non-coherent, can be issued by an application from user-space code, and have a simple API (application programming interface) that they can be used by the compiler, library, or end-user.

In one embodiment, GSM task execution does not provide/ support load-store access to a location within the global address space that is homed on a remote node. That is, when a particular global address space location is homed on example target node, a task executing on a different node is not able to access the location using a load or store instruction. Rather, with GSM task execution, a GSM operation (such as a read, write or atomic operation) must be employed in order to access the location. However, the executing task utilizes load and store instructions from the PowerPC® ISA (instruction set architecture) to access GSM locations that are homed on the node where the task is executing.

Figure 7:
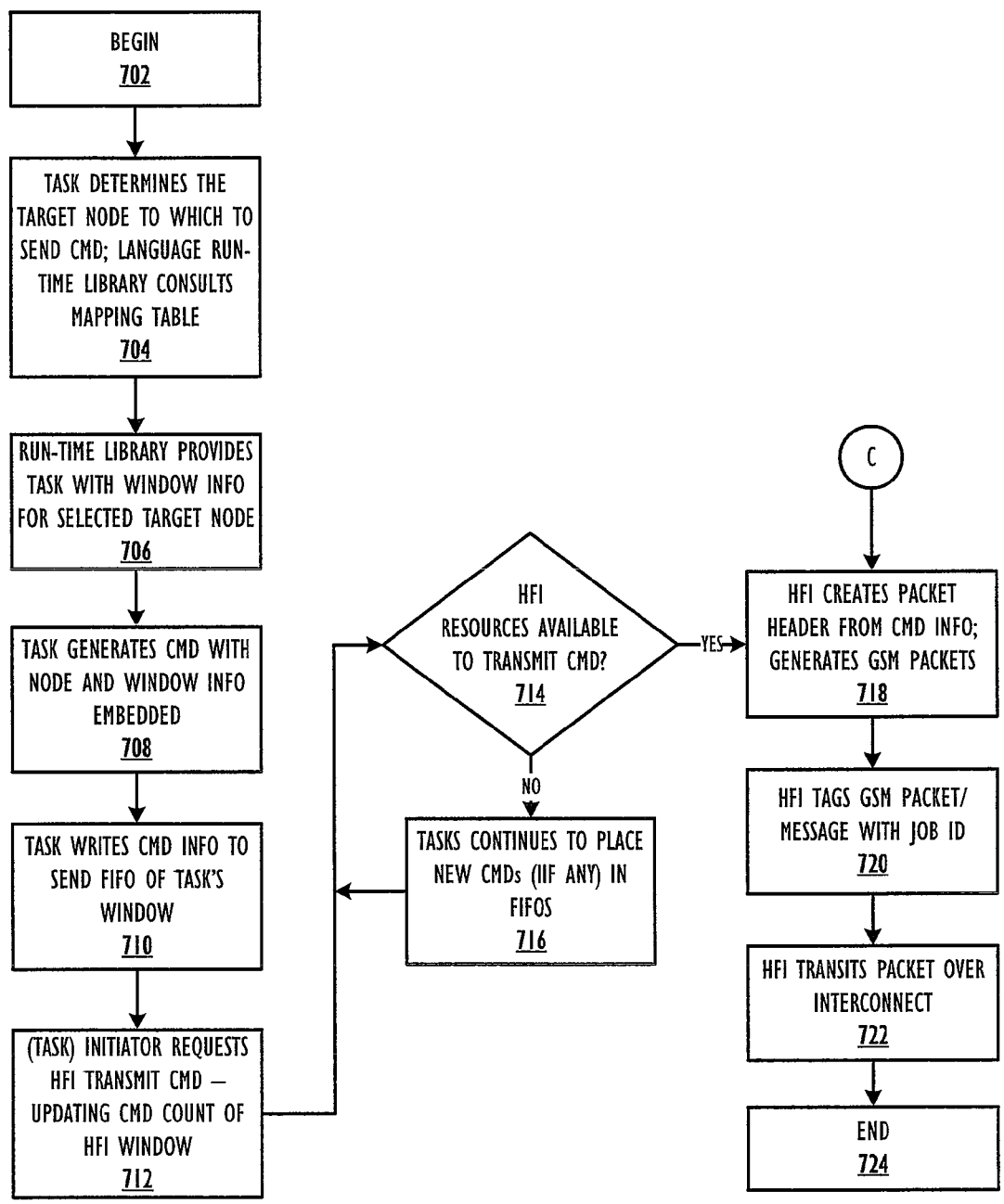
FIG. 7 is a flow chart illustrating the method by which the HFI processes a command generated by a task executing on the local node, in accordance with one embodiment of the invention.
Figure 8:
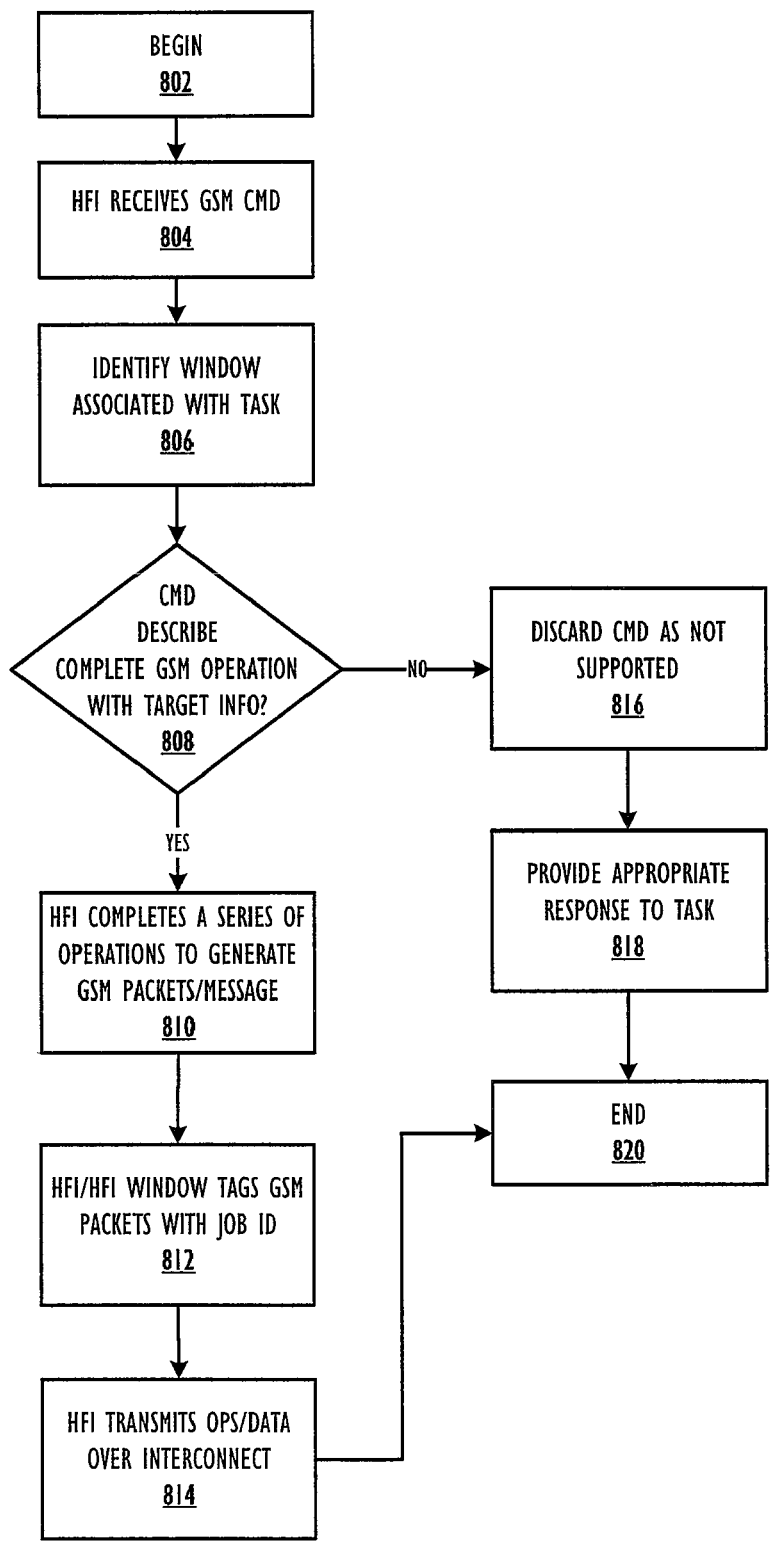
FIG. 8 is a flow chart illustrating the method by which the HFI generates and transmits a GSM packet, in accordance with one embodiment of the invention.
Figure 9:
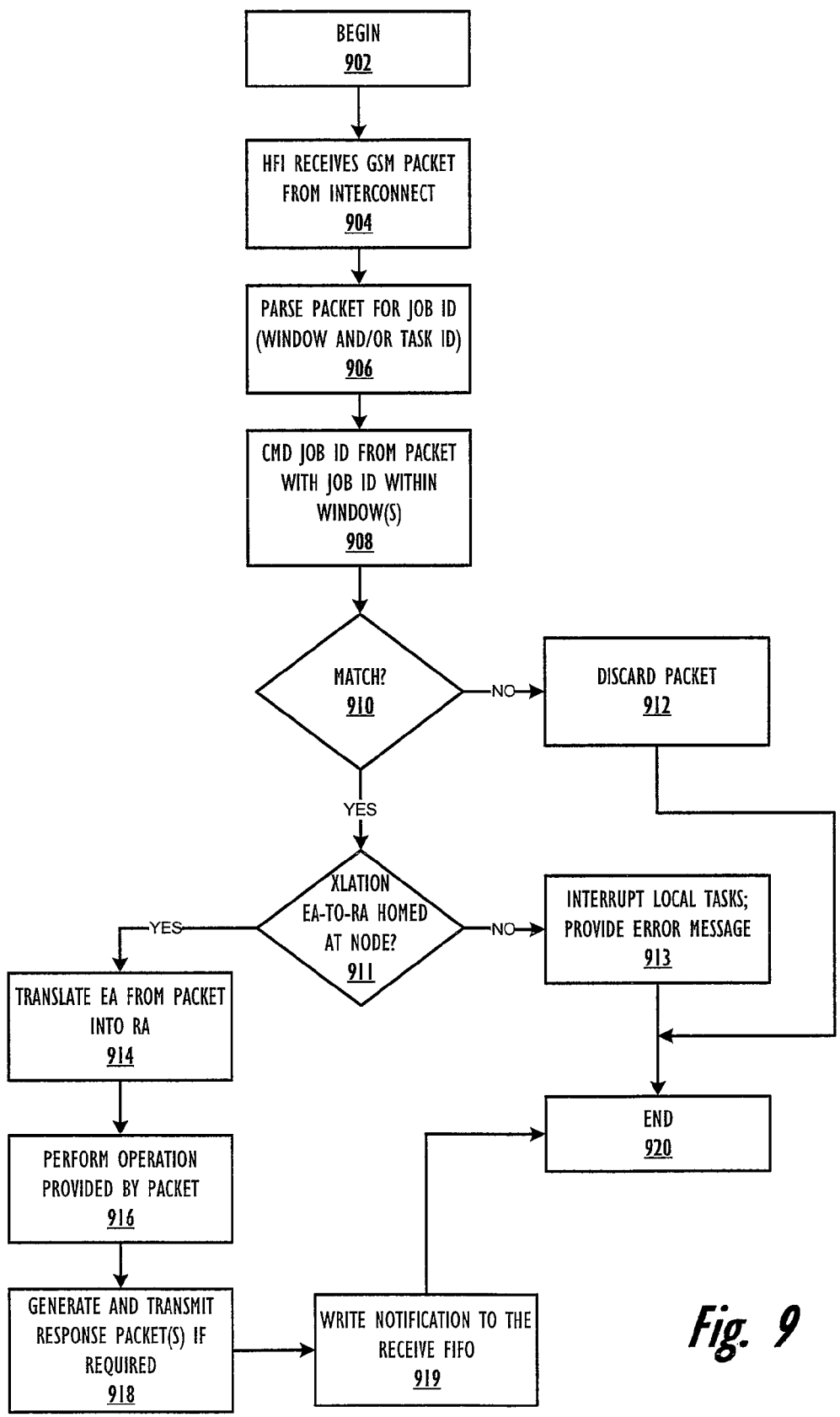
FIG. 9 is a flow chart of the method by which incoming GSM packets are processed by the HFI and the HFI window of a target/receiving node, according to one embodiment of the invention.

Turning now to FIGS. 7-9, which provide flow charts illustrating the methods by which the HFI and the HFI window are utilized to enable GSM operations across different physical nodes of a processing system. Although the methods illustrated in FIGS. 7-9 may be described with reference to components shown in FIGS. 1-5, it should be understood that this is merely for convenience and alternative components and/or configurations thereof can be employed when implementing the various methods. Key portions of the methods may be completed by the task executing within data processing system (DPS) 100 (FIGS. 1, 4) and controlling access to a GSM location of/on a target node, and the methods are thus described from the perspective of either/both the executing task and/or the HFI and HFI window. For example, referring to FIG. 4, a GSM operation is initiated by a task on node A 102a to a location that is homed in the effective address space of a task on node C 102b.

GSM commands issued by a task are in the form of operations on locations within another task's effective address space. Consequently, the effective address embedded in a GSM command is meaningless without knowing the specific task with reference to which the effective address must be translated into a real address. The HFI evaluates received GSM commands from a local send FIFO before generating the corresponding GSM message (packets). HFI and HFI window functionality provides the ability to launch GSM commands (i.e., interconnect messages) through user-space commands.

In the following description, the terms GSM packets, GSM messages, GSM operations, and GSM data are interchangeably utilized to refer to any component that is transmitted from a first HFI window of an initiating task to a network fabric and/or is received from the network fabric at a second HFI window of a target task. GSM command refers simply to any task-issued command that is intended to be processed by the HFI and issued to the network fabric. The task also provides non-GSM or standard commands that are executed on the local processing node.

FIG. 7 illustrates the method by which the HFI generates GSM packets from task-issued commands placed in a send FIFO (first-in first-out) buffer, in accordance with one embodiment of the invention. The process of FIG. 7 begins at block 702, and proceeds to block 704 at which the task determines a target node in the system to which an EA is homed within the GSM. Before a task is able to issue a GSM command, the task needs to have or obtain knowledge of the destination node and the destination node window for directing/addressing the local command. In one embodiment, the run-time library ascertains the physical node on which the task is executing by looking up the mapping table that is generated by the POE when the job is first launched. The runtime library provides the task with window information for the selected target node, as shown at block 706. At block 708, the task generates a command with the destination node and window information included in the command. It should be noted that the POE mapping is provide for convenience only. The present invention allows the task identifier to encode the node/window combination.

Referring to FIG. 4, as part of the command structure, the task on node A 102a creates the GSM command. The command structure includes the identifier (ID) of the destination/target node and the window on the destination node against which the message must be examined. Specifying the window on the destination node versus specifying the task (executing on the destination node) simplifies the hardware implementation. For put operations that involve long memory transfers, the task also includes the start effective address and range information as part of the command.

Returning to the flow chart, as provided at block 710, the task writes the command describing the operation into the send FIFO. These commands accumulate in initiating task's cache (FIFO) as the commands are created. At block 712, the task's initiator triggers/requests the HFI transmit the stored commands by updating the command count location/register, which is physically resident on the HFI window. As previously described, the command count location is memory mapped into the tasks address space of physical memory. This action constitutes "ringing" the HFI doorbell.

Referring again to FIG. 4, as the task creates GSM commands, the task keeps updating the number of operations that need to be handled by the HFI. Commands are created in the send FIFO 407 (FIG. 4), which is backed by local physical memory 408, and can be resident in the cache 405. The send FIFO resides in physical memory but is mapped into the task's address space and is cacheable by the task. After assembling one or more commands, the task writes the number of assembled commands to the HFI window door bell location 409. In one embodiment, the door bell location 409 is physically resident on the HFI 120, but is memory-mapped into the task's effective address space. The commands at the doorbell location 409 are retrieved by the HFI and utilized by the HFI to generate a GSM packet (containing GSM operations, data or messages) that the HFI transmits to a target task via the network fabric.

In order to transmit a GSM operation, the HFI needs certain buffer resources. As these buffer resources become available, the HFI retrieves commands from the send FIFO. Thus, at decision block 714, HFI logic determines if HFI resources are available to transmit the command using the task-assigned window. When HFI resources are not currently available, the task may continue to place new commands (if any) in the send FIFO, as shown at block 716. However, if there are HFI resources available, the HFI creates packet headers from the command information and generates the GSM packets, as shown at block 718. For long put operations, the HFI also translates the start address and fetches (DMAs) data from the local node. The retrieved data is used to create a GSM message. HFI data structures in the window assigned to the task are also referenced/updated. The HFI window tags the job ID of the task to the GSM message, as shown at block 720. The job ID is maintained in the send window and is included as part of every GSM message issued by the HFI window. At block 722, the HFI routes the message (as GSM packets)

through the interconnect switch. Then, the process of generating the GSM packets using the HFI ends at termination block 724.

FIG. 8 is a flow chart illustrating the method by which the HFI processes a received command from a task executing on the local node, according to one embodiment. The process begins at block 802 and proceeds to block 804 at which the HFI reads/receives the command(s) from the send FIFO when the HFI has the buffering resources necessary to transmit packets on the interconnect. The HFI also receives a count of the number of operations that need to be transmitted, so that the processor (104, FIG. 1) is decoupled from having to wait while the HFI may be busy transmitting prior commands. Each command either fully describes a GSM operation, or contains start and range information for long "put" (i.e., write data to target) operations. In order to facilitate GSM operations that operate on small amounts of data, a command can also contain immediate data, provided the combined command and data fit within a cache line of, for example, 128 bytes. If a put command is larger than some fixed size, the request is put onto the RDMA command send FIFO 515. This allows small data movement requests to be handled with higher priority than large data movement requests and prevents large transfers from blocking small transfers.

The HFI identifies the window associated with the task generating the commands placed in the task's send FIFO, as shown at block 806. The HFI logic then determines, at block 808, if the command is a legal GSM command. A legal GSM command includes the required target node and window identifiers, and an operation that is supported via GSM processing (e.g., a get, put, or atomic operation), and any other parameter(s) for generating a GSM packet. When the command is not a legal GSM command, the HFI window discards the command as not supported by GSM, as provided at block 816, and the HFI window provides an appropriate response/notification to the executing task, at block 818.

However, when the command is legal, the HFI completes a series of operations to generate the GSM packets from the command, as indicated at block 810. Among these operations performed by the HFI are one or more of (a) creating a packet header from the command information, (b) potentially fetching (via DMAs) data from the local node, and (c) generating the packets. The HFI window then tags the packet with the job ID at block 812, and the HFI window transmits the packets over the interconnect, at block 814. The process ends at termination block 820. In a system where the individual nodes execute operating systems that do not trust one another, the installed job ID (206) can also be encrypted or hashed to make it tamperproof.

Figure 10:
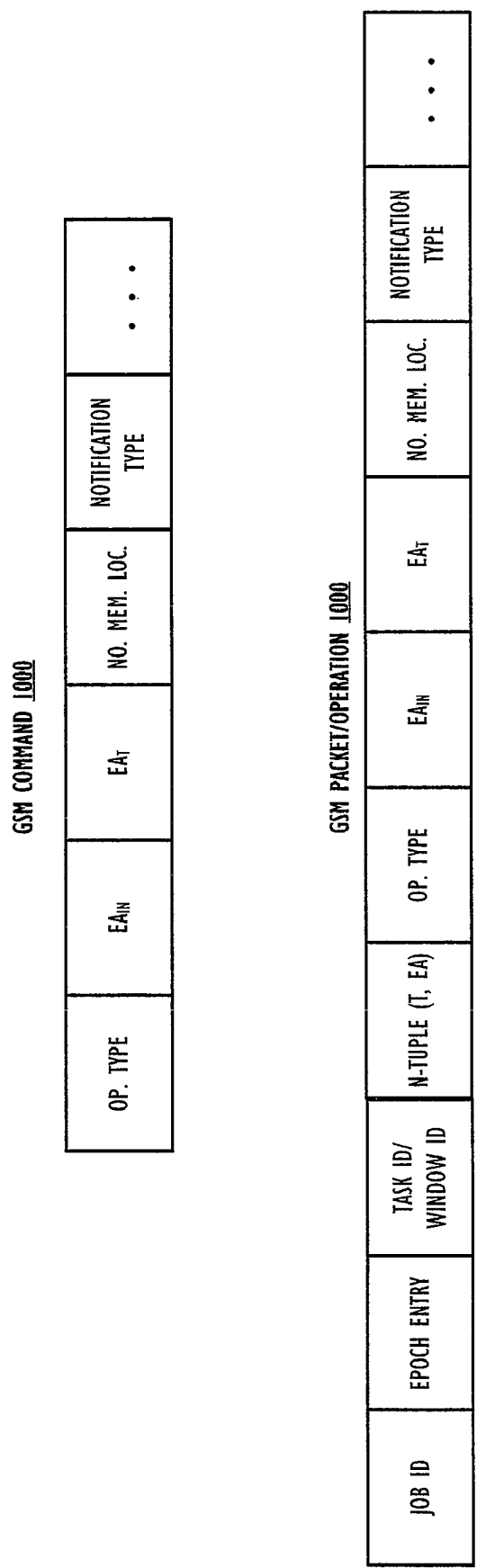
FIG. 10 is a block diagram representation of entries within an example GSM command and example GSM packet, in accordance with one embodiment of the invention.

In order to appreciate the generation and issuing of a GSM message (i.e., a GSM operation transmitted via multiple GSM packets) with sequence number and count tuples, an example GSM command and corresponding example GSM packet are illustrated by FIG. 10. The GSM command 1000 includes, without limitation, the following entries, shown without regard to actual order: an operation type, which defines whether the operation is an atomic operation or a GET or PUT operation, for example; the source effective address, $EA_S$, of the operation, which is mapped to the memory of the initiating/local task; the target effective address, $EA_T$, which is mapped to a real address in the local memory of the target task; the number of memory locations affected by the GSM operation; immediate data or the EA of the locally stored data; and flags indicating whether and/or what type of notification the receipt/completion of the operation requires. As shown, other entries may also be included within the command, and these entries are utilized to create corresponding entries within the GSM operation generated by the HFI.

FIG. 10 also illustrates an example GSM packet (of multiple packets) generated by the HFI in response to receiving a GSM command (for a message that cannot be transmitted by a single GSM packet). As shown, in addition to the above entries, GSM packet 1020 includes the HFI command (e.g., a remote addition operation), header information, including, without limitation and in no particular order: Job ID, which is the identification of the globally distributed job (or application), which ID is provided to each GSM packet originating from a tasks of the job; epoch entry, which is set to an actual epoch value for particular types of operations, when a guaranteed-once notification is assigned as the reliability mode. (A default value indicates a type of operation requiring a guaranteed-once delivery as the reliability mode; local and remote HFI window and node identifying task and window parameters to identify to which HFI window (or corresponding task) and at which node a GSMn HFI packet should be directed; and an index for a <sequence, count> n-tuple entry for tracking multiple GSM packets of a single GSM message/operation; and a count total of the number of expected packets.

D. Target/Receiving/Destination Node HFI Processing

When the message reaches the destination, hardware support provided by PERCS retrieves the data and sends the response back as a message. The response message is also handled by the HFI of the initiating node, causing the retrieved data to be written to the memory location of the initiating task. On the receive side of a GSM operation, the job ID in the packet is compared with the job ID in the target window. If the IDs match, the GSM command specified in the message is carried out.

For get operations, the effective address is translated on the target HFI through the use of MMU 121. Data is fetched from the memory location of the translated real address, and the data is embedded into a composed message and sent back to the initiating task (node). For put operations, the appended data is written to the physical address obtained by translating the specified effective address where the data is to be written at the target node. In one implementation, GSM atomic operations are carried out by the memory controller on board the processor chip, such as a Power7™ chip. The processor's internal bus is designed to support special transaction types for the atomic operations that are initiated by the HFI.

FIG. 9 illustrates the method by which the HFI processes received/incoming GSM messages (packets) from an initiating node, according to one embodiment. The incoming packets are processed by the HFI using the job ID and EA-to-RA matching table of the target node. The process begins at block 902 and proceeds to block 904 at which the HFI receives a GSM packet from the interconnect (through the local switch connection). The HFI parses the GSM packet for the job ID, at block 906. At block 908, HFI examines the job ID included in the message and compares the job ID with the job ID associated with the various windows supported/assigned within the HFI. A determination is made at block 910 whether the job ID matches one of the supported job IDs. If the job ID of the packet does not match any of the job IDs, the packet is discarded, as provided at block 912, and the process ends at termination block 920.

In one embodiment, the HFI may also evaluate the window and/or task ID to ensure that the packet has arrived at the correct destination node. As with the job ID, the message is discarded if the window ID information does not match that of the target window that is specified in the message. Also, in one embodiment, a threshold number of false requests may be established for each HFI window. When the number of received GSM operations that do not have the correct jobID meets of surpasses the pre-established threshold number, an error condition is registered, which triggers issuance of an administrative notification.

Returning to decision block 910, if the job IDs match, the HFI determines, at decision block 911, if a translation exists for the EA within the page table pointed to by the page table pointer (522, FIG. 5) within the HFI window. The translation is provided by MMU 121, which is accessed by the HFI to complete the check for whether the EA-to-RA translation is homed on the local node. When no valid translation exists for the EA received in the message, the local task associated with the window is interrupted, as shown at block 913. Several alternatives are possible. One alternative is to send an error response to the initiating node which could then send a non-GSM message to request a valid translation to be installed. Another alternative is for the interrupted task to install the required translation, in turn sending an error to the initiating task if the requested mapping does not exist on the target task. When a translation does exist within the page table, the HFI (via the page table) translates the effective address in the received message into the corresponding real address, as shown at block 914. The translation is performed by referencing the page table that is pointed to within the HFI window. When the address is successfully translated, the operation specified by the message is carried out/performed, as shown at block 916.

The operation is first presented on the internal fabric bus in the chip. The memory controller performs the operation on the memory DIMMs. If the locations being modified reside on any cache, the cache locations are updated in place, with the contents being injected into the cache. At block 918, the HFI window (via the task) generates and transmits a response packet, if such a response is required. The HFI also writes notifications to the receive FIFO (either writing the notification to memory or injecting the notification into the cache), as shown at block 819. These notifications are visible in the (target) task's effective address space. The (target) task can also access the locations that were modified by directly accessing the appropriate location in the (target) task's address space.

The message flows are similar for GSM atomic operations and GSM get operations. In an atomic operation, the memory controller can perform the atomic operation. Cache injection does not take place for atomic operations. For a get operation, the HFI does not perform the DMA operation and instead retrieves (DMAs) data requested by the operation. The retrieved data is assembled into a message that is then sent back to the initiating node. The HFI on the requestor performs the functions required to store the retrieved data into the initiating task's effective address space.

E. Issuing Global Shared Memory Operations

With the above described hardware configuration and task controlled methods (message flow, etc.), the below embodiments provide two different methodologies by which an executing task completes a GSM send operation. For purposes of this description, a GSM send operation includes a series of functions, which include (1) the task creating a GSM command, (2) the HFI receiving the GSM command or the task transmitting the command to the HFI, and (3) the HFI generating and issuing (to the network fabric) the GSM packet containing the associated GSM operation or data from the command.

The two methodologies utilize different mechanisms by which the task completes/performs the second aspect of the send operation. In the first methodology, the task composes a GSM command in the task's effective address space and stores the command within the send FIFO. As described above, and illustrated by FIGS. 4 and 5, the send FIFO is a sequence of contiguous memory locations, with RAs mapped to a subset of the EAs utilized by the task. The second methodology involves the task composing the GSM command within a cache line of the processor cache. The hardware components involved in performing both methodologies are illustrated by FIGS. 4 and 5, which figures will be references during the descriptions of the respective methodology.

E.1 Task Creation of Command in EA Space and Use of Send FIFO

Figure 11:
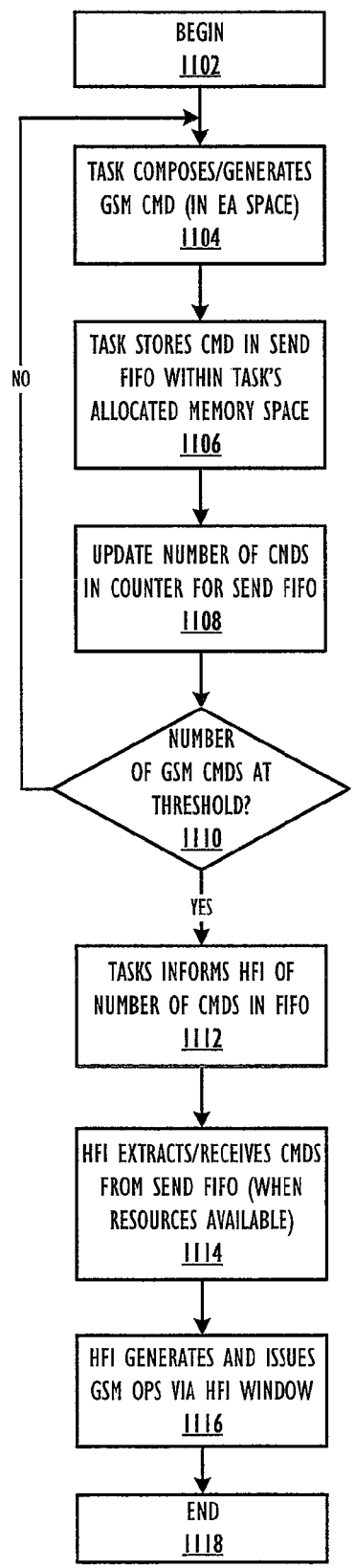
FIG. 11 is a flow chart illustrating the method by which an executing task enables GSM operations using a send FIFO, in accordance with one embodiment of the invention.

With reference now to FIG. 11, which illustrates the method by which the task (and HFI) interacts with the send FIFO to generate and issue (or perform) a GSM send operation, according to the first methodology. The process begins at block 1102 and proceeds to block 1104, which shows that the task composes a GSM command within the effective address space. The task utilizes the allocated EAs in the GAS as entries within the command to direct the resulting GSM operations. Generation of the GSM command involves the processor executing code that the task provides within the task's instruction sequence. Data required for data operations are retrieved from the cache and/or memory space allocated to the local task or generated from local processor operations. With the GSM command generated, the task then stores the command in the send FIFO within the local memory space allocated to the task, as shown at block 1106. As each command is stored within the send FIFO, the task updates a counter, which tracks the number of stored GSM commands within the send FIFO, as provided at block 1108. The task monitors the counter, and at decision block 1110, the task determines whether the number of commands within the send FIFO is at or above a pre-set, threshold number (e.g., a maximum number based on the RA space allocated to the send FIFO). The task continues to generate and store commands when the number is not at the threshold, until a desired number of commands have been composed.

When the number of commands within the send FIFO is at the threshold and/or when the HFI has available resources to process one or more of the stored commands, the task informs the HFI of the number of assembled GSM commands, as shown at block 1112. The HFI extracts the first GSM command from the task's send FIFO and forwards the command to the HFI window associated with the task, as shown at block 1114. The HFI then generates a corresponding GSM operation, encapsulates the operation in a GSM packet, and issues the GSM operations (in the GSM packet) to the network fabric, as provided at block 1116. These processes assume that the HFI has the resources available that are necessary to complete the generation and encapsulation of the GSM operation. The process then ends at block 1116.

E.2 Task Creation of Command in Cache Line and MMIO Injection to HFI

Figure 12:
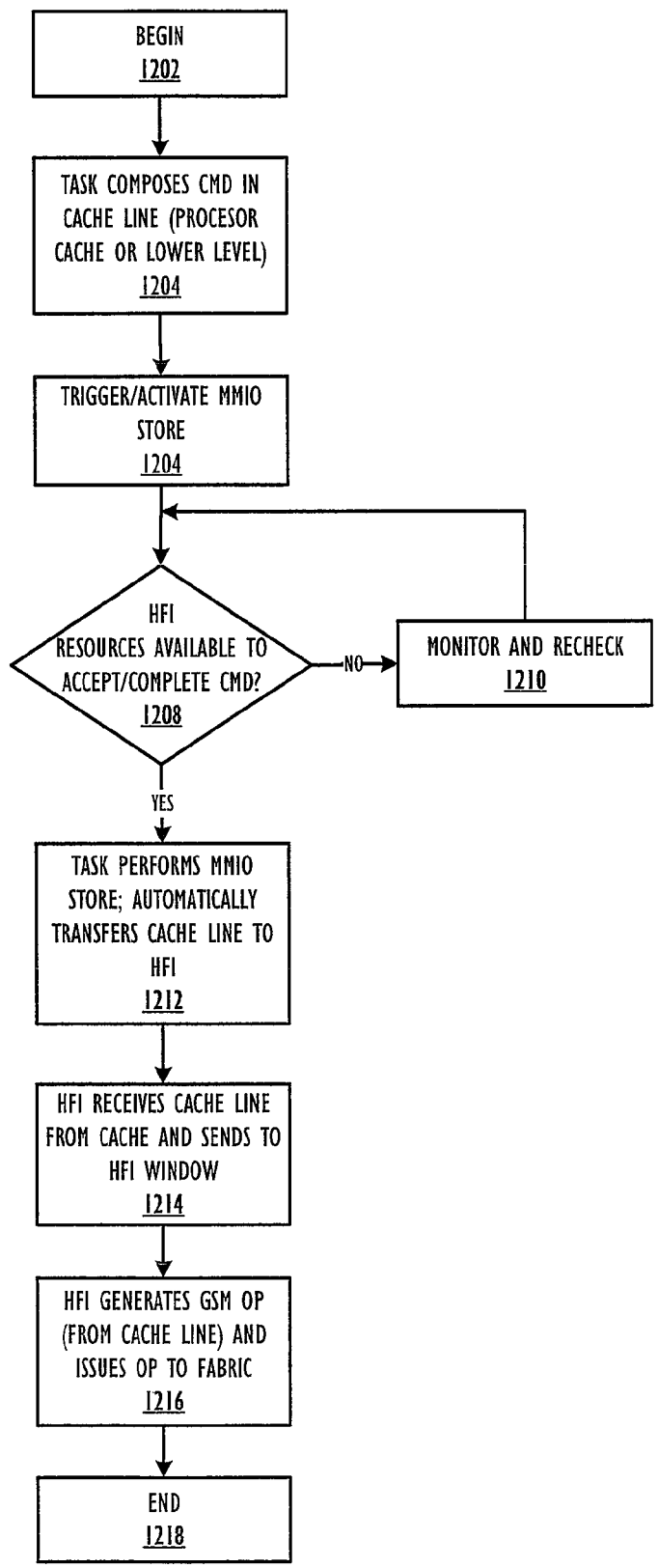
FIG. 12 is a flow chart illustrating the method by which the executing task enables GSM operations via direct MMIO cache line injection to an HFI, in accordance with one embodiment of the invention.

FIG. 12 illustrates the method by which the task composes (or assimilates) the GSM command in a cache line, which the tasks then forwards to the HFI, according to another embodiment of the invention. Specifically, according to this embodiment, the task generates the GSM operation by composing a GSM command in a cache line with an assigned effective address of the GAS, and then the task performs an MMIO store (operation) of the cache line, which operation atomically transfers the cache line to the HFI. The process begins at block 1202 and proceeds to block 1204 which shows that the task composes the GSM command in a cache line (at the processor cache or other on-chip, lower level cache). The task directs the processor to place components of the GSM command within the cache line, including operations and data. In one embodiment, a single cache line (which is at least as big as an interconnect flit) is allocated for this composition of the GSM command. Once the task completes composing the command within the cache line, the task initiates the MMIO store, by which the cache line may be automatically transferred to the HFI, as provided at block 1206. During set up of the task or during composition of the GSM command in the cache line, the HFI is identified as the target device for the MMIO store of the cache line. Before actual transfer of the cache line to the HFI can occur, however, a check is made, as provided at block 1208, whether the HFI has enough resources to accept the GSM command. If the HFI does not have enough resources, the task is made to wait and/or retry the MMIO store until the required HFI resources become available, as shown at block 1210. When the resources are available, the task performs the MMIO store and automatically transfers the cache line to the HFI, as shown at block 1212. The HFI receives the cache line and forwards the cache line to the HFI window assigned to the task, as shown at block 1214. The HFI logic performs the operations required to generate and issue the corresponding GSM operation (from the received command), as provided at block 1216. Then the process ends at termination block 1218. The above described method of issuing GSM send operations provides the task with a low latency method for issuing a GSM operation without requiring use of the HFI to retrieve data from the send FIFO, which is maintained either in a processor cache or lower level memory.

E.3 Task Handling of Received GSM Operations

Figure 13:
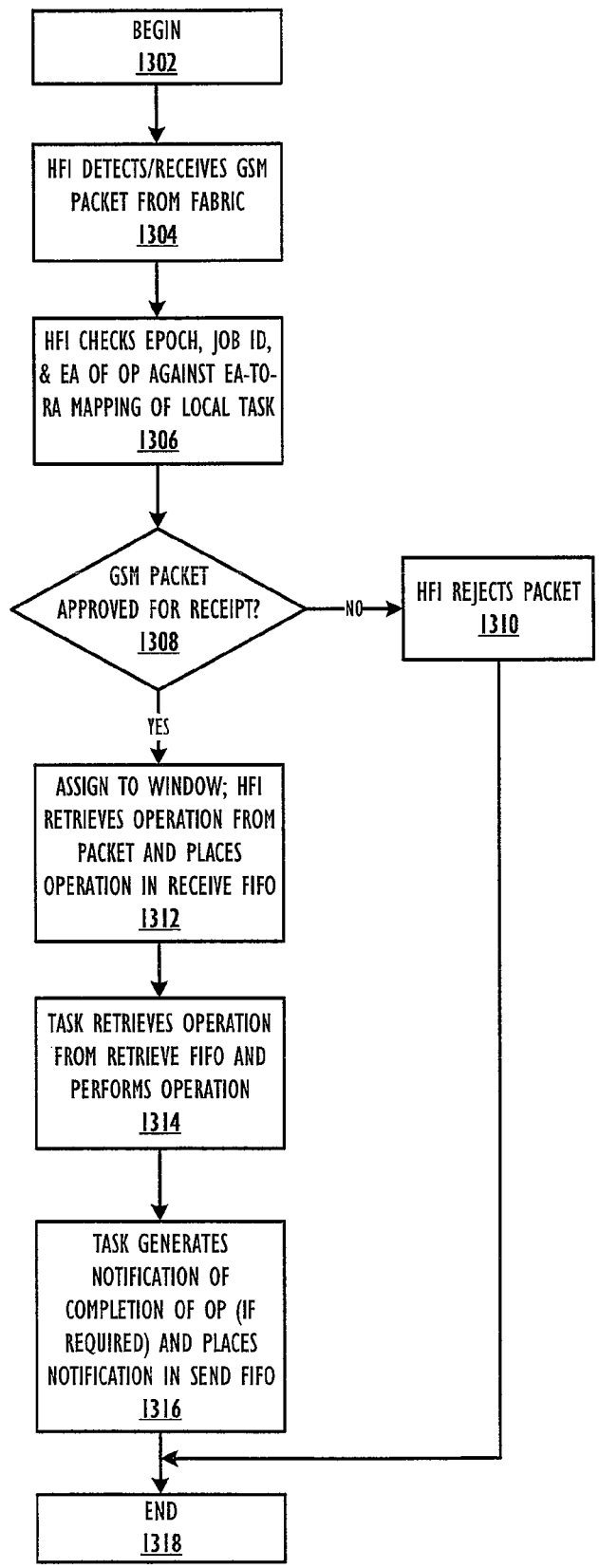
FIG. 13 is a flow chart illustrating the method by which a task processes received GSM operations using a receive FIFO, in accordance with one embodiment of the invention.

As described above, the HFI sits on the coherent fabric within the processor chip coupled also to the network fabric. With this configuration, the HFI is designed with the functionality to support GSM receive operations, i.e., detecting, evaluating and receiving GSM operations from the network fabric. FIG. 13 provides an illustration of the method by which the task utilizes the HFI to complete the receipt of GSM operations. The process begins at block 1302, and proceeds to block 1304 which illustrates the HFI detecting a GSM operation (packet) on the network fabric. The HFI checks the header information within the GSM packet, at block 1306, and the HFI determines at block 1308, whether the relevant header information (e.g., job ID) is provided for assigning to one of the HFI windows (i.e., a local task). If the relevant header information is not provided within the packet, the packet is discarded (or simply not accepted) by the HFI, as shown at block 1310. When the relevant header information is provided, the HFI forwards the GSM packet to the appropriate window, which window may also performs a check of other parameters from the GSM packet (e.g., epoch and N-tuple). Assuming all checks of packet information, including the EA-to-RA mapping of the local task passes, the HFI retrieves the GSM operation (or data) from the GSM packet and forwards the operation to the receive FIFO, as shown at block 1312. At block 1314, the task accesses the GSM operations placed in the received FIFO by the HFI and performs the operations. The task also generates a notification message, as shown in block 1316, which message the task places in the send FIFO to notify the initiating task (which generated the GSM operations) of the successful receipt and/or completion of the operation. The receiving process then ends at block 1318.

In some scenarios, the initiating task provides a GSM command that involves a transfer of a large amount of information, requiring multiple GSM operations to complete the transfer to the target task. When this scenario arises, the task provides an N-tuple entry within the GSM packets to track the transfer of the multiple GSM packets generated by the HFI for the single GSM command.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for issuing global shared memory (GSM) operations from an originating task on a first node coupled to a network fabric of a distributed network via a host fabric interface (HFI), said method comprising:
generating a GSM command within an effective address (EA) space of the originating task, wherein the originating task executes on the first node of a plurality of nodes across the distributed network, which plurality of nodes collective perform a global job that includes the originating task;
placing the GSM command within a send FIFO allocated to the originating task, wherein the send FIFO is a portion of real memory having real addresses (RA) that are mapped, within the first node, to EAs of a globally executing job for which the originating task maintains only a portion of the real address space mapped to the EAs of the globally executing job;
enabling retrieval of the GSM command from the send FIFO to a HFI window allocated to the originating task, wherein the HFI window utilizes information from the GSM command to generate a GSM packet that contains at least one of GSM operations and data; and
issuing the GSM packet to the network fabric via the HFI window.

2. The method of claim 1, further comprising:
responsive to the placing of the GSM command, automatically updating a counter, which tracks a number of GSM operations within the send FIFO;
comparing a value of the counter against a pre-established threshold number; and
when the counter value is at least as high as the pre-established threshold number, signaling the HFI to alert HFI logic of the presence of the threshold number of GSM operations within the send FIFO.

3. The method of claim 2, further comprising updating the counter value when a GSM command is retrieved by the HFI from the send FIFO.

4. The method of claim 1, wherein said placing the GSM command further comprises performing a memory mapped input/output (MMIO) store of the GSM command from the EA space to the HFI.

5. The method of claim 1, further comprising:
retrieving a received GSM operation from a receive FIFO;
performing the received GSM operation on the local node;
generating a notification message acknowledging at least one of a receipt of the GSM operation and a completion of the GSM operation, wherein said notification message is generated within the EA space of the originating task; and
placing the notification message within the send FIFO.

6. A processing node within a distributed data processing system comprising:
a processing unit with an originating task executing thereon, said originating task being a local task of a distributed job having multiple tasks executing at different nodes across a global shared memory (GSM) environment;
a local memory coupled to the processing unit and having real address (RA) space;
a host fabric interface (HFI) including a HFI window assigned to an originating task; and
program instructions executing on the processor and providing processing logic for issuing GSM operations from the originating task on a first node coupled to a network fabric of a distributed network via the HFI, wherein the processing logic comprises processing logic for:
generating a GSM command within an effective address (EA) space of the originating task, wherein the originating task executes on the first node of a plurality of nodes across the distributed network, which plurality of nodes collective perform a global job that includes the originating task;
placing the GSM command within a send FIFO allocated to the originating task, wherein the send FIFO is a portion of real memory having real addresses (RA) that are memory mapped to EAs of a globally executing job for which the originating task maintains, within the first node, only a portion of the real address space mapped to the EAs of the globally executing job;
enabling retrieval of the GSM command from the send FIFO to a HFI window allocated to the originating task, wherein the HFI window utilizes information from the GSM command to generate a GSM packet that contains at least one of GSM operations and data; and
issuing the GSM packet to the network fabric via the HFI window.

7. The processing node of claim 6, said processing logic further comprising logic for:
responsive to the placing of the GSM command, automatically updating a counter, which tracks a number of GSM operations within the send FIFO;
comparing a value of the counter against a pre-established threshold number; and
when the counter value is at least as high as the pre-established threshold number, signaling the HFI to alert HFI logic of the presence of the threshold number of GSM operations within the send FIFO.

8. The processing node of claim 7, said processing logic further comprising logic for updating the counter value when a GSM command is retrieved by the HFI from the send FIFO.

9. The processing node of claim 6, wherein said processing logic for placing the GSM command further comprises logic for performing a memory mapped input/output (MMIO) store of the GSM command from the EA space to the HFI.

10. The processing node of claim 6, said processing logic further comprising logic for:
retrieving a received GSM operation from a receive FIFO;
performing the received GSM operation on the local node;
generating a notification message acknowledging at least one of a receipt of the GSM operation and a completion of the GSM operation, wherein said notification message is generated within the EA space of the originating task; and
placing the notification message within the send FIFO for transmission to the network fabric.

11. A computer program product comprising:
a machine readable storage medium; and
program code stored on the machine readable storage medium that when executed on a processing node performs the function of issuing global shared memory (GSM) operations from an originating task on a first node coupled to a network fabric of a distributed network via a host fabric interface (HFI), said program code comprising code for:
generating a GSM command within an effective address (EA) space of the originating task, wherein the originating task executes on the first node of a plurality of nodes across the distributed network, which plurality of nodes collective perform a global job that includes the originating task;

placing the GSM command within a send FIFO allocated to the originating task, wherein the send FIFO is a portion of real memory having real addresses (RAs) that are memory mapped, within the first node, to EAs of a globally executing job for which the originating task maintains only a portion of the real address space mapped to the EAs of the globally executing job;

enabling retrieval of the GSM command from the send FIFO to a HFI window allocated to the originating task, wherein the HFI window utilizes information from the GSM command to generate a GSM packet that contains at least one of GSM operations and data; and issuing the GSM packet to the network fabric via the HFI window.

12. The computer program product of claim 11, wherein said program code further comprises program code for:

responsive to the placing of the GSM command within the send FIFO, automatically updating a counter, which tracks a number of GSM operations within the send FIFO;

comparing a value of the counter against a pre-established threshold number; and when the counter value is at least as high as the pre-established threshold number, signaling the HFI to alert HFI logic of the presence of the threshold number of GSM operations within the send FIFO.

13. The computer program product of claim 12, said program code further comprising code for updating the counter value when a GSM command is retrieved by the HFI from the send FIFO.

14. The computer program product of claim 11, wherein said program code for placing the GSM command further comprises code for performing a memory mapped input/output (MMIO) store of the GSM command from the EA space to the HFI.

15. The computer program product of claim 11, said program code further comprising code:

retrieving a received GSM operation from a receive FIFO;

performing the received GSM operation on the first node;

generating a notification message acknowledging at least one of a receipt of the GSM operation and a completion of the GSM operation, wherein said notification message is generated within the EA space of the originating task; and placing the notification message within the send FIFO for transmission to the network fabric.

* * * * *